US012809281B2

(12) United States Patent
Terui et al.

(10) Patent No.: US 12,809,281 B2
(45) Date of Patent: Nov. 24, 2026

(54) TONER

(71) Applicant: CANON KABUSHIKI KAISHA, Tokyo (JP)

(72) Inventors: Yuhei Terui, Shizuoka (JP); Kenji Aoki, Shizuoka (JP); Shintaro Noji, Shizuoka (JP); Yu Yoshida, Shizuoka (JP); Mariko Yamashita, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 585 days.

(21) Appl. No.: 18/339,928

(22) Filed: Jun. 22, 2023

(65) Prior Publication Data

US 2023/0418174 A1 Dec. 28, 2023

(30) Foreign Application Priority Data

Jun. 22, 2022 (JP) ................................ 2022-100448

(51) Int. Cl.
*G03G 9/087* (2006.01)
*G03G 9/08* (2006.01)

(52) U.S. Cl.
CPC ....... *G03G 9/08711* (2013.01); *G03G 9/0821* (2013.01); *G03G 9/08795* (2013.01); *G03G 9/08797* (2013.01)

(58) Field of Classification Search
CPC ........... G03G 9/08711; G03G 9/08795; G03G 9/08797
See application file for complete search history.

(56) References Cited

U.S. PATENT DOCUMENTS

| | | | |
|---|---|---|---|
| 2005/0214670 | A1 | 9/2005 | Matsumoto |
| 2009/0035682 | A1 | 2/2009 | Shima |
| 2014/0308611 | A1 | 10/2014 | Shimano et al. |
| 2017/0045834 | A1 | 2/2017 | Shirai |
| 2019/0384195 | A1 | 12/2019 | Saeki |
| 2020/0225598 | A1 | 7/2020 | Sriskandha |
| 2021/0181647 | A1 | 6/2021 | Hashimoto |
| 2022/0107573 | A1 | 4/2022 | Akiyama |

FOREIGN PATENT DOCUMENTS

| | | | |
|---|---|---|---|
| JP | H0934163 | A | 2/1997 |
| JP | 2004191927 | A | 7/2004 |
| JP | 2014130243 | A | 7/2014 |

(Continued)

OTHER PUBLICATIONS

Kamae, Machine Translation of JP2021-096278A, Jun. 24, 2021 (Year: 2021).*

*Primary Examiner* — Peter L Vajda
*Assistant Examiner* — Jenna Kuipers
(74) *Attorney, Agent, or Firm* — Canon U.S.A., Inc., IP Division

(57) ABSTRACT

A toner comprising a toner particle, the toner particle comprising a resin, wherein, where a chloroform-soluble component of the resin is analyzed by gradient LC analysis using acetonitrile as a poor solvent and chloroform as a good solvent for the chloroform-soluble component of the resin, a peak detected in a range of a ratio of chloroform in the mobile phase of 50.0 to 75.0% by volume and a peak detected in a range of a ratio of chloroform in the mobile phase of 75.0 to 95.0% by volume satisfy a specific relationship.

9 Claims, 1 Drawing Sheet

(56) References Cited

FOREIGN PATENT DOCUMENTS

| | | | | |
|---|---|---|---|---|
| JP | 2014142632 | A | | 8/2014 |
| JP | 2016-066018 | A | | 4/2016 |
| JP | 2016110150 | A | | 6/2016 |
| JP | 2016-218237 | A | | 12/2016 |
| JP | 2018-151619 | A | | 9/2018 |
| JP | 2019-219645 | A | | 12/2019 |
| JP | 2020173414 | A | | 10/2020 |
| JP | 2021-036316 | A | | 3/2021 |
| JP | 2021-096463 | A | | 6/2021 |
| JP | 2021092707 | A | | 6/2021 |
| JP | 2021096278 | A | * | 6/2021 |
| WO | 2013047296 | A1 | | 4/2013 |
| WO | 2019225207 | A1 | | 2/2021 |

* cited by examiner

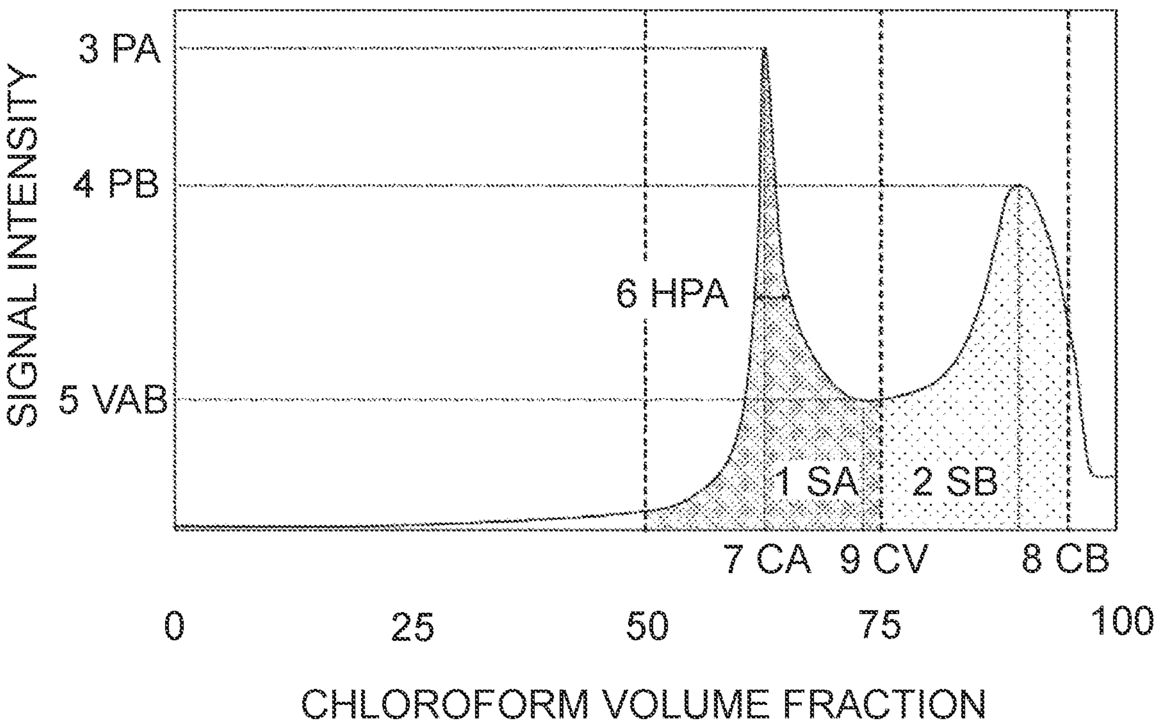
3 PA
4 PB
6 HPA
5 VAB
SIGNAL INTENSITY
1 SA
2 SB
7 CA
9 CV
8 CB
0
25
50
75
100
CHLOROFORM VOLUME FRACTION

TONER

BACKGROUND OF THE INVENTION

Field of the Invention

The present disclosure relates to a toner for use in electrophotography and electrostatic recording.

Description of the Related Art

Conventionally, energy conservation has been considered a major technical issue for electrophotographic devices, and a significant reduction in the amount of heat applied to fixing devices has been considered. In particular, there is an increasing need for so-called "low-temperature fixability" of toners which enables fixing at lower energy.

One of the methods for enabling fixing at a low temperature involves lowering the glass transition temperature (Tg) of a binder resin in a toner. However, since lowering the Tg leads to lower heat-resistant storage stability of the toner, it is considered difficult to achieve both low-temperature fixability and heat-resistant storage stability of the toner in this method.

As a measure to address this, WO 2013/047296 and Japanese Patent Application Laid-Open No. 2016-066018 discuss a toner to which a plasticizer is added. The plasticizer can increase the softening speed of the binder resin while maintaining the Tg of the toner and makes it possible to achieve both low-temperature fixability and heat-resistant storage stability. However, since the toner is softened through a step of melting the plasticizer and plasticizing the binder resin, there is a limit to the melting speed of the toner, and further improvement in low-temperature fixability is desired. Therefore, in order to further achieve both low-temperature fixability and heat-resistant storage stability of toner, a method of using a crystalline vinyl resin as a binder resin has been studied. Amorphous resins generally used as binder resins for toners do not show a clear endothermic peak in differential scanning calorimeter (DSC) measurement, but when a crystalline resin component is comprised, an endothermic peak (melting point) appears in DSC measurement.

Crystalline vinyl resins have the property of hardly softening up to the melting point due to the regular arrangement of side chains in a molecule. In addition, the crystals melt abruptly at the melting point as a boundary, resulting in a rapid decrease in viscosity. For this reason, crystalline vinyl resins are attracting attention as materials that have an excellent sharp-melt property and achieve both low-temperature fixability and heat-resistant storage stability. Generally, a crystalline vinyl resin has a long-chain alkyl group as a side chain in the main chain skeleton, and the long-chain alkyl groups of the side chains are crystallized to form a crystalline resin.

Japanese Patent Application Laid-Open No. 2016-218237 proposes a method for producing a toner comprising crystalline vinyl resin excellent in production stability by introducing an unsaturated group into a crystalline vinyl resin. Further, Japanese Patent Application Laid-Open No. 2021-096463 proposes a method for achieving both low-temperature fixability and hot offset resistance with a toner using a crystalline vinyl resin obtained by copolymerizing a polymerizable monomer having a long-chain alkyl group and an amorphous polymerizable monomer having a different SP value, and an amorphous resin. Further, Japanese Patent Application Laid-Open No. 2021-036316 proposes a method for obtaining a toner having both low-temperature fixability and hot offset resistance and also excellent durability by cross-linking a crystalline vinyl resin and an amorphous resin.

However, it has been found that there is still a disadvantage to be resolved in Japanese Patent Application Laid-Open No. 2016-218237, Japanese Patent Application Laid-Open No. 2021-096463 and Japanese Patent Application Laid-Open No. 2021-036316 in obtaining high charging stability under both high-temperature and high-humidity environment and low-temperature and low-humidity environment while achieving both low-temperature fixability and hot offset resistance. In Japanese Patent Application Laid-Open No. 2016-218237, a toner is obtained by reacting a polymerizable monomer and a crystalline vinyl resin, but since there is a large difference in reactivity between the crystalline resin and the polymerizable monomer, there is a disadvantage in terms of charging stability in a low-temperature and low-humidity environment. In Japanese Patent Application Laid-Open No. 2021-096463 and Japanese Patent Application Laid-Open No. 2021-036316, by introducing a polar group into a crystalline vinyl resin, favorable charging performance is expressed under a low-temperature and low-humidity environment, but there is a disadvantage in terms of charge retention under high-temperature and high-humidity conditions.

SUMMARY OF THE INVENTION

The present disclosure provides a toner that has excellent low-temperature fixability and hot offset resistance, a wide fixable temperature range, and excellent charging stability in both high-temperature and high-humidity environment and low-temperature and low-humidity environment.

The present disclosure relates to a toner comprising a toner particle, the toner particle comprising a resin, wherein where a chloroform-soluble component of the resin extracted from the toner particle is a soluble portion obtained by extraction from the toner particle for 48 h in Soxhlet extraction using a chloroform solvent from which a component having a molecular weight of 2000 or less is removed by recycling HPLC, and the chloroform-soluble component of the resin is analyzed by gradient LC analysis using acetonitrile as a poor solvent and chloroform as a good solvent for the chloroform-soluble component of the resin, and changing linearly from a mobile composition of 100% by volume of acetonitrile to a mobile phase of 100% by volume of chloroform, when an area of a peak detected using a Corona charged particle detector in a range of a ratio of chloroform in the mobile phase of 50.0 to 75.0% by volume is defined as SA and a maximum value of the peak is defined as PA, an area of a peak detected using a Corona charged particle detector in a range of a ratio of chloroform in the mobile phase of 75.0 to 95.0% by volume is defined as SB and a maximum value of the peak is defined as PB, and a smallest minimum value exists between the PA and the PB is defined as VAB, the PA and the PB exist, and the SA, the SB, the PB, and the VAB satisfy formulas (1) and (2).

$$0.30 \leq SA/SB \leq 0.85 \quad (1)$$

$$0.25 \leq VAB/PB \leq 0.55 \quad (2).$$

According to the present disclosure, it is possible to provide a toner that has excellent low-temperature fixability and hot offset resistance, a wide fixable temperature range, and excellent charging stability in both high-temperature and high-humidity environment and low-temperature and low-humidity environment. Further features of the present disclosure will become apparent from the following description of exemplary embodiments with reference to the attached drawings.

BRIEF DESCRIPTION OF THE DRAWINGS

The FIGURE shows an example of the results of gradient LC analysis.

DESCRIPTION OF THE EMBODIMENTS

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined. The (meth)acrylic acid ester means an acrylic acid ester and/or a methacrylic acid ester.

The "monomer unit" refers to the reacted form of a monomer substance in a polymer. For example, one carbon-carbon bond section in the main chain in the polymer in which the polymerizable monomer has been polymerized is defined as one unit. The polymerizable monomer can be represented by the following formula (C).

(C)

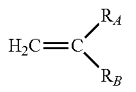

In the formula (C), $R_A$ represents a hydrogen atom or an alkyl group (preferably an alkyl group having from 1 to 3 carbon atoms, and more preferably a methyl group), and R B represents an arbitrary substituent.

The present inventors paid attention to the polarity distribution of resin components comprised in a toner and found that the above disadvantage can be solved by appropriately controlling the polarity distribution of the resins constituting the toner.

In order to obtain low-temperature fixability of a toner using a crystalline vinyl resin, it is important to comprise a certain amount or more of the crystalline vinyl resin in the resin in the toner particle. The polarity of crystalline vinyl resins can be controlled to some extent by the composition of the constituent monomer units, but since crystalline vinyl resins generally need to have a long-chain alkyl structure in a high proportion, the polarity thereof tends to be low.

In order to obtain a higher sharp-melt property, it is necessary to ensure high crystallinity, for example, by increasing the content ratio of longer long-chain alkyl units, and such resins have low polarity and tend to have low electrical resistance, making it difficult to maintain charge.

In order to obtain excellent charging performance by using a crystalline resin that exhibits such charging characteristics, combinations with the conventionally used amorphous resins have been considered. Specifically, it was considered that by using a crystalline resin excellent in sharp-melting property in combination with a resin having a different polarity from the crystalline resin, charging stability could be obtained due to the amorphous resin while low-temperature fixability is expressed due to the crystalline resin, intensive investigations were conducted, and the following toner was obtained.

The present disclosure relates to a toner comprising a toner particle, the toner particle comprising a resin, wherein where a chloroform-soluble component of the resin extracted from the toner particle is a soluble portion obtained by extraction from the toner particle for 48 h in Soxhlet extraction using a chloroform solvent from which a component having a molecular weight of 2000 or less is removed by recycling HPLC, and the chloroform-soluble component of the resin is analyzed by gradient LC analysis using acetonitrile as a poor solvent and chloroform as a good solvent for the chloroform-soluble component of the resin, and changing linearly from a mobile composition of 100% by volume of acetonitrile to a mobile phase of 100% by volume of chloroform, when an area of a peak detected using a Corona charged particle detector in a range of a ratio of chloroform in the mobile phase of 50.0 to 75.0% by volume is defined as SA and a maximum value of the peak is defined as PA, an area of a peak detected using a Corona charged particle detector in a range of a ratio of chloroform in the mobile phase of 75.0 to 95.0% by volume is defined as SB and a maximum value of the peak is defined as PB, and a smallest minimum value exists between the PA and the PB is defined as VAB, the PA and the PB exist, and the SA, the SB, the PB, and the VAB satisfy formulas (1) and (2).

$$0.30 \leq SA/SB \leq 0.85 \quad (1)$$

$$0.25 \leq VAB/PB \leq 0.55 \quad (2).$$

First, the gradient LC analysis will be explained. In the gradient LC analysis, unless otherwise specified, the chloroform-soluble component of the resin obtained by removing components having a molecular weight of 2000 or less by recycling HPLC from a soluble component obtained by extracting the toner particle for 48 h by Soxhlet extraction using a chloroform solvent is taken as a sample. The gradient LC analysis is performed on an elution component obtained when using acetonitrile as a poor solvent and chloroform as a good solvent for the chloroform-soluble component of the resin extracted from the toner particle and linearly changing from a mobile composition of 100% by volume of acetonitrile to a mobile phase of 100% by volume of chloroform.

An area of a peak detected using a Corona charged particle detector in the range of the ratio of chloroform in the mobile phase of 50.0 to 75.0% by volume is defined as SA and the maximum value of the peak is defined as PA. Further, an area of a peak detected using a Corona charged particle detector in the range of the ratio of chloroform in the mobile phase of 75.0 to 95.0% by volume is defined as SB and the maximum value of the peak is defined as PB. Furthermore, a smallest minimum value present between the maximum value PA and the maximum value PB is defined as VAB.

At this time, the PA and the PB are present. Also, the SA, SB, PB, and VAB satisfy formulas (1) and (2).

$$0.30 \leq SA/SB \leq 0.85 \quad (1)$$

$$0.25 \leq VAB/PB \leq 0.55 \quad (2)$$

Although the details will be described hereinbelow, the signal detected using the Corona charged particle detector, which is obtained according to the ratio of chloroform in the mobile phase in the gradient LC analysis, shows a magnitude of polarity. The higher the volume fraction of chloroform, the lower the polarity of the component.

The peak maximum value PA and area SA in the range of the ratio (volume fraction) of chloroform in the mobile phase of 50.0 to 75.0% by volume, which are obtained by gradient LC analysis, are derived from an amorphous resin component with a relatively high polarity. Meanwhile, the peak maximum value PB and area SB in the range of the ratio of chloroform in the mobile phase of 75.0 to 95.0% by volume are derived from a crystalline resin component with a relatively low polarity.

SA/SB, which is the ratio of the area of the signal derived from the amorphous resin component and the area of the signal derived from the crystalline resin component in the gradient LC analysis, shows the balance between the charge retention property due to the amorphous resin component and the charge leakage property due to the crystalline resin component. It has been found that where SA/SB is from 0.30 to 0.85, a remarkable effect on charging performance is demonstrated. Where SA/SB is less than 0.30, the leakage property in a high-temperature and high-humidity environment is too strong, and charging stability is lowered in a durability test. Moreover, when SA/SB is larger than 0.85, the leakage property cannot be obtained in a low-temperature and low-humidity environment, so that significant charge-up is generated in the durability test.

SA/SB is preferably 0.40 to 0.80, more preferably 0.50 to 0.77, even more preferably 0.60 to 0.75, and still more preferably 0.65 to 0.75. SA/SB can be increased by increasing the ratio of resin components having high polarity in the toner particle. Also, SA/SB can be reduced by increasing the ratio of resin components having low polarity in the toner particle.

SA is preferably 25.0 to 45.0, more preferably 35.0 to 42.0.

SB is preferably 45.0 to 65.0, more preferably 50.0 to 55.0.

The smallest minimum value VAB among the minimum values between the maximum value PA and the maximum value PB is an index of the degree to which a component with a polarity intermediate between those of the amorphous resin component and the crystalline resin component is present as a whole. It is considered that where the minimum value VAB is present in a certain proportion, charge transfer is enabled between the maximum value PA and the maximum value PB and a synergistic effect of the characteristics of each component can be obtained.

In particular, it is important to control the charge leakage property in order to obtain excellent charging characteristics of the toner, and it is important to control the ratio of the minimum value VAB to the maximum value PB derived from the crystalline resin component. Where VAB/PB is from 0.25 to 0.55, it indicates that a moderate amount of a resin exhibiting intermediate polarity between those of a low-polarity crystalline resin and a high-polarity amorphous resin is comprised, and a remarkable effect of transferring the charge accumulated in the amorphous resin component to the crystalline resin component is demonstrated.

Where VAB/PB is less than 0.25, the amount of the component with a polarity intermediate between those of the amorphous resin component and the crystalline resin component is too small, making it difficult to transfer charges. As a result, suppression of charge-up is not expressed in the durability test. Meanwhile, where VAB/PB is more than 0.55, the charge leakage property becomes strong, and it becomes impossible to maintain charging performance under a high-temperature and high-humidity environment.

VAB/PB is preferably 0.30 to 0.50, more preferably from 0.35 to 0.45. VAB/PB can be increased by bringing the polarities of the resin component having high polarity and the resin component having low polarity in the toner particle close to each other, by increasing the amount of the resin component generated by the polymerization reaction between the low-polarity resin having a polymerizable functional group and the polymerizable monomer having polarity, by adding a resin component having an intermediate polarity in addition to the resin component having a high polarity and the resin component having a low polarity in the toner particle, by reducing the content ratio of the resin component having a low polarity, and the like. Further, VAB/PB can be decreased by increasing the difference in polarity between the resin component having a high polarity and the resin component having a low polarity in the toner particle, by increasing the content ratio of the resin component having a low polarity, and the like.

PA is, for example, preferably 2.0 to 5.0, more preferably 3.0 to 4.5. PB is, for example, preferably 2.0 to 4.0, more preferably 2.5 to 3.5. VAB is, for example, preferably 0.8 to 2.0, more preferably 1.0 to 1.3.

It follows from the above that by satisfying the above formulas (1) and (2), it is possible to demonstrate excellent charging stability in both high-temperature and high-humidity environment and low-temperature and low-humidity environment in a toner excellent in low-temperature fixability and hot offset resistance.

In addition, a resin obtained by extracting a component in the range of the ratio of chloroform in the mobile phase of 50.0 to 75.0% by volume in the gradient LC analysis is defined as a resin A, which is a resin component corresponding to the maximum value PA. Further, a resin obtained by extracting a component in the range of the ratio of chloroform in the mobile phase of 75.0 to 95.0% by volume in the gradient LC analysis is defined as a resin B, which is a resin component corresponding to the maximum value PB. At this time, the resin B has a monomer unit (a) represented by formula (3).

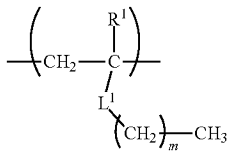

(3)

In the formula (3), $R^1$ represents a hydrogen atom or a methyl group, $L^1$ represents a single bond, an ester bond or an amide bond, and m represents an integer of 15 to 30.

With the resin component having the monomer unit (a), the maximum value PB is likely to be expressed in the range of chloroform volume fraction of 75.0 to 95.0% by volume in the gradient LC analysis, which is preferable for controlling the charging stability. $L^1$ is preferably an ester bond, and it is more preferable that the carbonyl in the ester bond —COO— be bonded to the carbon having $R^1$. Where m is in the range of from 15 to 30, the obtained resin B expresses excellent crystallinity, so that a toner having excellent low-temperature fixability can be obtained. m is preferably from 18 to 24, more preferably from 20 to 22.

A method for introducing the monomer unit (a) represented by formula (3) into the resin B can be exemplified by a method of polymerizing the following (meth)acrylic acid esters. Examples of the esters include (meth)acrylic acid esters having a linear alkyl group having 16 to 31 carbon atoms [stearyl (meth)acrylate, nonadecyl (meth)acrylate, eicosyl (meth)acrylate, heneicosanyl (meth)acrylate, behenyl (meth)acrylate, lignoceryl (meth)acrylate, ceryl (meth)

acrylate, octacosyl (meth)acrylate, myricyl (meth)acrylate, dotriacontyl (meth)acrylate, and the like] and (meth)acrylic acid esters having a branched alkyl group having 16 to 31 carbon atoms [2-decyltetradecyl (meth)acrylate and the like]. The monomer unit (a) may be formed by using monomers of one type or a combination of monomers of two or more types.

The content ratio of the monomer unit (a) represented by formula (3) in the resin B is preferably 40.0 to 95.0% by mass, more preferably 60.0 to 93.0% by mass, and even more preferably 70.0 to 90.0% by mass. Within the above ranges, the balance between low-temperature fixability and hot offset resistance is excellent.

The resin B is preferably a vinyl resin. The resin B can also have other monomer units in addition to the monomer unit (a). The other monomer unit can be introduced by polymerizing the above (meth)acrylic acid ester and another vinyl-based monomer.

Examples of other vinyl-based monomers include the following. Styrene, α-methylstyrene, and (meth)acrylic acid esters such as methyl (meth)acrylate, ethyl (meth)acrylate, n-butyl (meth)acrylate, t-butyl (meth)acrylate, and 2-ethylhexyl (meth)acrylate.

Monomers having a urea group: for example, monomers obtained by reacting amines having 3 to 22 carbon atoms [primary amines (normal butylamine, t-butylamine, propylamine, isopropylamine, and the like), secondary amines (di-normal ethylamine, di-normal propylamine, di-normal-butylamine, and the like), aniline, cyclohexylamine, and the like] and isocyanates having an ethylenically unsaturated bond and having 2 to 30 carbon atoms by a known method. Monomers having a carboxyl group: for example, methacrylic acid, acrylic acid, and 2-carboxyethyl (meth)acrylate. Monomers having a hydroxyl group: for example, 2-hydroxyethyl (meth)acrylate, 2-hydroxypropyl (meth) acrylate, and the like. Monomers having an amide group: for example, acrylamide and monomers obtained by reacting an amine having 1 to 30 carbon atoms and a carboxylic acid having an ethylenically unsaturated bond and having 2 to 30 carbon atoms (acrylic acid, methacrylic acid, and the like) by a known method.

Among them, it is preferable to use styrene, methacrylic acid, acrylic acid, methyl (meth)acrylate, and t-butyl (meth) acrylate.

The resin B preferably has a styrene-based monomer unit represented by the following formula (A). Moreover, the resin B preferably has a (meth)acrylic acid-based monomer unit represented by the following formula (B).

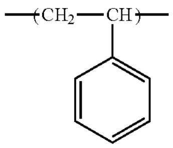

(A)

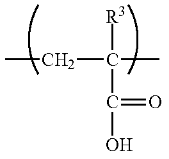

(B)

In formula (B), $R^3$ represents a hydrogen atom or a methyl group. $R^3$ is preferably a methyl group.

The content ratio of the styrene-based monomer unit in the resin B is preferably 1.0 to 50.0% by mass, more preferably 10.0 to 30.0% by mass, and even more preferably from 15.0 to 25.0% by mass The content ratio of the (meth)acrylic acid-based (preferably methacrylic acid-based) monomer unit in the resin B is preferably 0.5 to 5.0% by mass, more preferably 1.0 to 3.0% by mass, and even more preferably 1.0 to 2.0% by mass.

The number-average molecular weight Mn of the resin B is preferably 4000 to 13,000, more preferably 6000 to 9000. The weight-average molecular weight Mw of the resin B is preferably 10,000 to 50,000, more preferably 20,000 to 30,000.

Also, when the acid value of the resin B is defined as Avb (mg KOH/g), Avb preferably satisfies formula (4)

$$1.5 \leq Avb \leq 25.0 \quad (4)$$

When Avb is 1.5 mg KOH/g or more, it is possible to introduce a polar group with excellent water adsorption properties due to the acid value, so that it is possible to moderately promote water adsorption, and charge transfer between the amorphous resin component and the crystalline resin component is facilitated. As a result, charge-up in a low-temperature and low-humidity environment is more advantageously suppressed, and more excellent charging stability is achieved. Meanwhile, where Avb is 25.0 mg KOH/g or less, the composition unevenness due to the acid value can be reduced, so that the charge leakage from the amorphous resin to the crystalline resin can be more advantageously suppressed, and excellent charging stability under high temperature and high humidity is achieved. Avb is preferably from 3.0 to 25.0, more preferably from 5.0 to 20.0, and even more preferably from 6.0 to 15.0.

Next, when a half-value width of the PA is defined as HPA (% by volume), the HPA preferably satisfies formula (5):

$$3.0 \leq HPA \leq 10.0 \quad (5).$$

HPA represents the composition distribution of the resin A corresponding to PA. Where HPA is 3.0 or more, the shape of the PA is not too sharp, so there is an effect of further suppressing charge-up in a low-temperature and low-humidity environment. Meanwhile, where HPA is 10.0 or less, the composition distribution is small, which is excellent from the viewpoint of maintaining a sufficient charge quantity, and thus excellent charge stability in a high-temperature and high-humidity environment is achieved.

HPA is more preferably from 5.0 to 8.0, still more preferably from 6.0 to 7.5. HPA can be increased by making the composition distribution of the constituent resins non-uniform. In addition, HPA can be reduced by making the composition distribution of the constituent resins uniform. As for the composition distribution, where the resin is obtained using polymerizable monomers, the composition distribution can be made uniform by combining polymerizable monomers with similar reactivity. Conversely, the composition distribution can be made non-uniform by combining polymerizable monomers with different reactivities. The reactivity can be changed by the molecular weight of each polymerizable monomer, the unsaturated groups of the polymerizable monomers, and the like. For example, the higher the molecular weight of the polymerizable monomer, the lower the reactivity, and the lower the molecular weight, the higher the reactivity. Further, where the unsaturated groups of the polymerizable monomer are acrylic groups and methacrylic acid groups, the reactivity of the polymerizable monomer is increased because the methacrylic groups have high reactivity.

Moreover, when an acid value of the resin A is defined as AVa (mg KOH/g), the AVa preferably satisfies formula (6):

$$0.0 \leq AVa \leq 3.0 \quad (6).$$

Where a crystalline resin with a strong leakage property, such as the resin B, is present in the toner, the lower the acid value of the amorphous resin A, the better the charge retention property. Therefore, when Ava is within the above range, the charging stability is excellent in a high-temperature and high-humidity environment. Ava is more preferably from 0.0 to 2.5, still more preferably from 0.0 to 2.0, even more preferably from 0.0 to 1.0, and particularly preferably 0.0.

The resin A preferably has styrene-based monomer units and (meth)acrylic acid alkyl ester-based monomer units. With a resin having a styrene-based monomer units and (meth)acrylic acid alkyl ester-based monomer units, the maximum value PA is likely to be expressed in the range of the chloroform volume fraction of 50.0 to 75.0% by volume in the gradient LC analysis. Furthermore, such resin is suitable for controlling HPA within the range described above, and also is preferable for controlling charging stability.

The resin A preferably has a styrene-based monomer unit represented by the following formula (D) and a (meth) acrylic acid alkyl ester-based monomer unit represented by the following formula (E). For example, the resin A is a copolymer of styrene and a (meth)acrylic acid alkyl ester having an alkyl group having 1 to 12 (preferably 1 to 6, more preferably 2 to 4) carbon atoms.

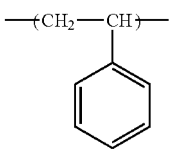

(D)

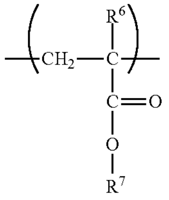

(E)

In formula (E), $R^6$ represents a hydrogen atom or a methyl group, and $R^7$ represents an alkyl group having 1 to 12 (preferably 1 to 6, more preferably 2 to 4) carbon atoms.

The content ratio of the styrene-based monomer unit represented by the formula (D) in the resin A is preferably 40.0 to 90.0% by mass, more preferably 50.0 to 85.0% by mass, even more preferably 60.0 to 80.0% by mass, and still more preferably from 65.0 to 75.0% by mass. The content ratio of the (meth)acrylic acid alkyl ester-based monomer unit represented by the formula (E) in the resin A is preferably 10.0 to 60.0% by mass, more preferably 15.0 to 50.0% by mass, even more preferably 20.0 to 40.0% by mass, and still more preferably 25.0 to 35.0% by mass.

In the gradient LC analysis of the chloroform-soluble component of the resins extracted from the toner particle, the volume fraction of chloroform in the mobile phase when the maximum value PA is expressed is defined as CA (% by volume), the volume fraction of chloroform in the mobile phase when the maximum value PB is expressed is defined as CB (% by volume), and the volume fraction of chloroform in the mobile phase when the minimum value VAB is expressed is defined as CV (% by volume). At this time, it is preferable that CA and CB satisfy formula (7).

$$10.0 \leq CB - CA \leq 30.0 \quad (7)$$

Formula (7) represents the difference in the chloroform volume fraction between the maximum value PA and the maximum value PB, indicating that there is an appropriate difference in polarity between the resin A and the resin B. Where the difference CB−CA (% by volume) in volume fraction is 10.0 or more, there is a sufficient difference in polarity between the resin A and the resin B, so that the charge leakage of the toner can be further suppressed, and more excellent charging stability is achieved under a high-temperature and high-humidity environment. Meanwhile, where CB−CA (% by volume) is 30.0 or less, since the polarities of the resin A and the resin B are close to each other to some extent, charge transfer is more likely to occur, and charge-up suppression effect is likely to be expressed under a low temperature and low-humidity environment, and more excellent charging stability is achieved. CB−CA (% by volume) is preferably 12.5 to 25.0, more preferably 17.0 to 22.0.

CA (% by volume) is preferably 50.0 to 75.0, more preferably 60.0 to 70.0. CB (% by volume) is preferably 70.0 to 92.0, more preferably 80.0 to 90.0. CV (% by volume) is preferably 65.0 to 80.0, more preferably 70.0 to 80.0.

The content ratio of the resin A among the resins comprised in the toner particle is defined as MA (% by mass), and the content ratio of the resin B among the resins comprised in the toner particle is defined as MB (% by mass). Further, an insoluble component obtained by extraction for 48 h in the Soxhlet extraction of the toner particle using a chloroform solvent is separated. A resin component obtained by removing incineration ash residue from the obtained insoluble component is defined as a resin C, and the content ratio of the resin C in the resins comprised in the toner particle is defined as MC (% by mass).

At this time, the MA (% by mass), the MB (% by mass) and the MC (% by mass) preferably satisfy formulas (8), (9) and (10).

$$MA + MB + MC \leq 100.0 \quad (8)$$

$$25.0 \leq MA \leq 55.0 \quad (9)$$

$$15.0 \leq MB \leq 50.0 \quad (10)$$

Formula (8) represents the total amount of the resin A, resin B, and resin C comprised in the toner, and indicates that resins other than resin A, resin B, and resin C may be comprised. MA+MB+MC is more preferably 60.0 to 90.0, still more preferably 70.0 to 85.0, and even more preferably 75.0 to 80.0. Formula (9) represents the content of the resin A in the resins in the toner particle, and formula (10) represents the content of the resin B in the resins in the toner particle.

Where the content ratio MA of the resin A is 25.0 to 55.0% by mass, the total charge quantity of the toner can be satisfied, and therefore the charging characteristics are excellent in a high-temperature and high-humidity environment and a low-temperature and low-humidity environment. A more preferable range of MA is from 30.0 to 50.0% by mass, more preferably from 35.0 to 45.0% by mass.

When the content ratio MB of the resin B is 15.0 to 50.0% by mass, the toner is more excellent from the viewpoint of achieving both low-temperature fixability and hot offset resistance. MB is more preferably from 17.5 to 45.0% by mass, still more preferably from 20.0 to 40.0% by mass, and even more preferably from 20.0 to 25.0% by mass.

Furthermore, it is preferable that the content ratio MC (% by mass) of the resin C in the resins comprised in the toner particle satisfies formula (11).

$$3.0 \leq MC \leq 30.0 \quad (11)$$

The resin C is a resin component that does not dissolve in chloroform and is a component that has a high molecular weight as a resin or a resin component having a crosslinked structure. Such a resin maintains the toner elasticity of the toner particle at high temperatures, thereby making it easier to control the hot offset resistance.

Where MC is from 3.0 to 30.0% by mass, the toner is excellent in achieving both low-temperature fixability and hot offset resistance. MC is more preferably from 5.0 to 25.0% by mass, and still more preferably from 10.0 to 20.0% by mass.

The content of the resin A in the toner can be controlled by the addition amount of the resin A or the addition amount of the polymerizable monomer that becomes the resin A. Furthermore, the content of the resin B can be controlled by the addition amount of the crystalline resin that becomes the resin B. Furthermore, the content of the resin C can be controlled by the addition amount of chloroform-insoluble component comprised in the resin to be added, the addition amount of a polymerizable monomer having two or more reactive groups in the molecule, or the addition amount of the macromonomer that is a resin having an unsaturated double bond, which will be described hereinbelow.

Moreover, the resin C preferably has a monomer unit (b) represented by formula (12):

(12)

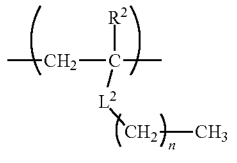

In formula (12), $R^2$ represents a hydrogen atom or a methyl group, $L^2$ represents a single bond, an ester bond, or an amide bond, and n represents an integer of 15 to 30.

$L^2$ is preferably an ester bond, and it is more preferable that the carbonyl in the ester bond —COO— be bonded to the carbon having $R^2$. n is preferably 18 to 24, more preferably 20 to 22.

The structure of formula (12) above indicates that the resin C has a long-chain alkyl group. By including a long-chain alkyl group having 16 or more carbon atoms in the resin C, which is a resin component of the toner particle insoluble in chloroform, an intermediate behavior is exhibited when charges are exchanged between the amorphous resin component and the crystalline resin component, whereby the charging stability can be further improved.

It is preferable that the resin A have a glass transition point Tga (° C.), the resin B have a melting point Tmb (° C.), and the resin C have a melting point Tmc (° C.). Tga (° C.), Tmb (° C.) and Tmc (° C.) preferably satisfy formulas (13), (14) and (15).

$$40.0 \leq Tga \leq 65.0 \quad (13)$$

$$50.0 \leq Tmb \leq 75.0 \quad (14)$$

$$45.0 \leq Tmc \leq 65.0 \quad (15)$$

Where the resin A has a glass transition point Tga (° C.) of from 40.0 to 65.0° C., more excellent charge stability in a low-temperature and low-humidity environment and low-temperature fixability are achieved. Tga is more preferably from 45.0 to 55.0° C.

Where the melting point Tmb (° C.) of the resin B is from 50.0 to 75.0° C., more excellent charge-up suppression in a low-temperature and low-humidity environment, low-temperature fixability, and hot offset resistance are achieved. Tmb is more preferably from 55.0 to 65.0° C. Where the melting point Tmc (° C.) of the resin C is from 45.0 to 65.0° C., more excellent charge retention property under a high-temperature and high-humidity environment and charge-up suppression effect under a low-temperature and low-humidity environment are achieved. Tmb is more preferably from 50.0 to 60.0° C.

The FIGURE shows an example of the analysis results of gradient LC analysis. Numerical values in parentheses indicate symbols in the FIGURE. The area SA (1), maximum value PA (3), half-value width HPA (6) of maximum value PA (3), and volume fraction CA (7) when the chloroform volume fraction is from 50.0 to 75.0% by volume can be controlled as follows.

First, HPA (6), which is the half-value width of the maximum value derived from the resin A, and the chloroform volume fraction CA (7) can be controlled by the composition of the resin A. Specifically, HPA (6) can be controlled by the difference in reactivity of the polymerizable monomers that are the raw materials of the monomer units constituting the resin A and the difference in polarity of the polymerizable monomers. The larger the difference in reaction rate or the larger the difference in polarity of the monomers, the larger the half-value width HPA (6). For example, in the case of a resin obtained by vinyl polymerization, the higher the molecular weight of the polymerizable monomers, the slower the reaction rate. In addition, the reaction rate is faster with a polymerizable monomer into which a methacrylic group is introduced than with a polymerizable monomer into which an acrylic group is introduced.

The area SA (1) and maximum value PA (3) with a chloroform volume fraction of 50.0 to 75.0%, which are derived from the resin A having the maximum value PA (3), can be controlled by the total amount of resin A in the toner particle and the half-value width HPA (6). Specifically, the area SA (1) and maximum value PA (3) can be controlled by the amount of resin A added when producing the toner particle, or the total amount of polymerizable monomers that become the resin A when polymerization is involved.

The maximum value PB (4) derived from the resin B with the chloroform volume fraction of 75.0 to 95.0%, the chloroform volume fraction CB (8) showing the maximum value PB (4), and SB (2) can be controlled by the composition of the resin B and the total amount of resins when producing the toner particle, as with the chloroform volume fraction CA (7) of the maximum value PA of the resin A described hereinabove.

Furthermore, the minimum value VAB (5) between the maximum value PA (3) and the maximum value PB (4) can be controlled by the ratio of the resin A and the resin B in the toner particle and the composition of the resins. In particular, where the half-value width of the resin A and the resin B is small, VAB tends to decrease, and where the half-value width is large, VAB tends to increase. In addition, adding a resin having polarity intermediate between those of the resin A and the resin B and having a composition distribution is effective in increasing the value of VAB. CV (9) is the chloroform volume fraction at the minimum value VAB.

Copolymers of a macromonomer that is a resin having a reactive unsaturated double bond, a styrene-based monomer, and a polymerizable monomer including a (meth)acrylic acid alkyl ester are preferred as the resin C having a polarity intermediate between those of the resin A and the resin B and a composition distribution. Alternatively, a crystalline vinyl resin obtained by copolymerizing a polymerizable monomer having a long-chain alkyl and a polymerizable monomer having a polarity different from that of the polymerizable monomer is preferred.

The macromonomer that is a low-polarity resin having a reactive unsaturated double bond is preferably a macromonomer derived from an alkyl acrylate or alkyl methacrylate. The alkyl acrylate or alkyl methacrylate constituting the macromonomer preferably has from 12 to 30 carbon atoms in the alkyl moiety. Alkyl acrylates or alkyl methacrylates are also referred to below as alkyl (meth)acrylates.

The alkyl (meth)acrylates having from 12 to 30 carbon atoms in the alkyl moiety are preferably lauryl (meth) acrylate, tridecyl (meth)acrylate, myristyl (meth)acrylate, pentadecyl (meth)acrylate, hexadecyl (meth)acrylate, heptadecyl (meth)acrylate, stearyl (meth)acrylate, nonadecyl (meth)acrylate, icosyl (meth)acrylate, henicosyl (meth)acrylate, behenyl (meth)acrylate, tricosyl (meth)acrylate, tetracosyl (meth)acrylate, pentacosyl (meth)acrylate, hexacosyl (meth)acrylate, heptacosyl (meth)acrylate, octacosyl (meth) acrylate, nonacosyl (meth)acrylate, and triacontyl (meth) acrylate.

Using these monomers together makes it easier to adjust the melting point of the macromonomer. Where an alkyl (meth)acrylate having an alkyl moiety with 12 or more carbon atoms is used, heat resistance and durability are improved. The use of an alkyl (meth)acrylate having an alkyl moiety with 30 or less carbon atoms ensures good granulation properties.

Monomers other than the above monomers may be reacted as well. Examples thereof include styrene and styrene derivatives such as α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene and p-phenylstyrene; vinyl esters such as methylene aliphatic monocarboxylic acid esters, vinyl acetate, vinyl propionate, vinyl butyrate, vinyl benzoate, and vinyl formate; vinyl ethers such as vinyl methyl ether, vinyl ethyl ether, and vinyl isobutyl ether; vinyl ketones such as vinyl methyl ketone, vinyl hexyl ketone, and vinyl isopropyl ketone, and the like.

Examples of methods for introducing a polymerizable functional group to the terminal of the acrylic resin polymerized using the above monomers include the following methods. For example, a method by which the above monomer is radically polymerized using a polymerization initiator having a terminal hydroxyl group, such as VA-086 (Wako Pure Chemical Industries, Ltd.), and an acrylic resin having a terminal hydroxyl group derived from the initiator is modified with a polymerizable functional group polymerizable with styrene. With another method, the above monomer is radically polymerized using a polymerization initiator having a terminal carboxyl group, such as VA-057 (Wako Pure Chemical Industries, Ltd.), and an acrylic resin having a terminal carboxyl group derived from the initiator is modified with a polymerizable functional group polymerizable with styrene.

With yet another method, a hydroxyl group or a carboxyl group is introduced into the polymer by using a vinyl monomer having a hydroxyl group, such as 2-hydroxyethyl acrylate, 2-hydroxyethyl methacrylate, and the like, or a vinyl monomer having a carboxyl group, such as acrylic acid, methacrylic acid, and the like, in addition to the above monomer, to modify the acrylic resin with a polymerizable functional group polymerizable with styrene.

Examples of the modification methods include modification by a Schotten-Baumann reaction using an acid chloride, a urethane reaction using isocyanate, and the like. Examples of specific reagents include acryloyl chloride, methacryloyl chloride, p-styrenesulfonyl chloride, 2-acryloyloxyethyl isocyanate, 2-methacryloyloxyethyl isocyanate, and the like. As another modification technique, there is a modification method by an epoxy addition reaction between a carboxyl group and a glycidyl group.

Specific reagents include (meth)acrylic acid esters having a glycidyl group, such as glycidyl acrylate, glycidyl methacrylate, 2-hydroxyethylglycidyl acrylate, 2-hydroxyethylglycidyl methacrylate, 4-hydroxybutylglycidyl acrylate, 4-hydroxybutylglycidyl methacrylate, and the like. As another method, a macromonomer is obtained by high-temperature continuous polymerization as described in Japanese Patent Application Laid-Open No. 2002-363203.

A polymerizable monomer other than styrene may be used in combination with the polymerizable monomer composition. Examples of preferred polymerizable monomers include styrene derivatives such as α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, and p-phenylstyrene; acrylic polymerizable monomers such as methyl acrylate, ethyl acrylate, n-propyl acrylate, iso-propyl acrylate, n-butyl acrylate, isobutyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate, and 2-benzoyloxyethyl acrylate; methacrylic polymerizable monomers such as methyl methacrylate, ethyl methacrylate, n-propyl methacrylate, iso-propyl methacrylate, n-butyl methacrylate, isobutyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate, and dibutyl phosphate ethyl methacrylate; vinyl esters such as methylene aliphatic monocarboxylic acid esters, vinyl acetate, vinyl propionate, vinyl butyrate, vinyl benzoate, and vinyl formate; vinyl ethers such as vinyl methyl ether, vinyl ethyl ether, and vinyl isobutyl ether; vinyl ketones such as vinyl methyl ketone, vinyl hexyl ketone, and vinyl isopropyl ketone; and the like.

Other examples include diethylene glycol diacrylate, triethylene glycol diacrylate, tetraethylene glycol diacrylate, polyethylene glycol diacrylate, 1,6-hexanediol diacrylate, neopentyl glycol diacrylate, tripropylene glycol diacrylate, polypropylene glycol diacrylate, 2,2'-bis(4-(acryloxydiethoxy)phenyl)propane, trimethylolpropane triacrylate, tetramethylolmethane tetraacrylate, ethylene glycol dimethacrylate, diethylene glycol dimethacrylate, triethylene glycol dimethacrylate, tetraethylene glycol dimethacrylate, polyethylene glycol dimethacrylate, 1,3-butylene glycol dimethacrylate, 1,6-hexanediol dimethacrylate, neopentyl glycol dimethacrylate, polypropylene glycol dimethacrylate, 2,2'-bis(4-(methacryloxydiethoxy)phenyl)propane, 2,2'-bis (4-(methacryloxypolyethoxy)phenyl)propane, trimethylolpropane trimethacrylate, tetramethylolmethane tetramethacrylate, divinylbenzene, divinylnaphthalene, divinyl ether, 4,4'-divinyl biphenyl, and the like.

Examples of the polymerizable monomers used in the crystalline vinyl resin obtained by copolymerizing a polymerizable monomer having a long-chain alkyl and a polymerizable monomer having a different polarity are as follows. The polymerizable monomers having a long-chain alkyl are preferably alkyl meth(acrylates) having from 12 to 30 (preferably from 18 to 26, more preferably from 20 to 24) carbon atoms in the alkyl moiety, such as lauryl (meth)acrylate, tridecyl (meth)acrylate, myristyl (meth)acrylate, pentadecyl (meth)acrylate, hexadecyl (meth)acrylate, heptadecyl (meth)acrylate, stearyl (meth)acrylate, nonadecyl (meth) acrylate, icosyl (meth)acrylate, henicosyl (meth)acrylate, behenyl (meth)acrylate, tricosyl (meth)acrylate, tetracosyl (meth)acrylate, pentacosyl (meth)acrylate, hexacosyl (meth) acrylate, heptacosyl (meth)acrylate, octacosyl (meth)acrylate, nonacosyl (meth)acrylate, and triacontyl (meth)acrylate.

Examples of the polymerizable monomers having a polarity different from that of the polymerizable monomers having a long-chain alkyl include the following. Monomers having a nitrile group: for example, acrylonitrile, methacrylonitrile, and the like. Monomer having a hydroxyl group: for example, 2-hydroxyethyl (meth)acrylate, 2-hydroxypropyl (meth)acrylate, and the like. Monomers having an amide group: for example, acrylamide, monomers obtained by reacting an amine having 1 to 30 carbon atoms and a carboxylic acid having 2 to 30 carbon atoms and having an ethylenically unsaturated bond (acrylic acid, methacrylic acid, and the like) by a known method, and the like.

Monomers having a urethane group: for example, monomers obtained by reacting an alcohol having 2 to 22 carbon atoms and having an ethylenically unsaturated bond (2-hydroxyethyl methacrylate, vinyl alcohol, and the like) with an isocyanate having 1 to 30 carbon atoms [monoisocyanate compounds (benzenesulfonyl isocyanate, tosyl isocyanate, phenyl isocyanate, p-chlorophenyl isocyanate, butyl isocyanate, hexyl isocyanate, t-butyl isocyanate, cyclohexyl isocyanate, octyl isocyanate, 2-ethylhexyl isocyanate, dodecyl isocyanate, adamantyl isocyanate, 2,6-dimethylphenyl isocyanate, 3,5-dimethylphenyl isocyanate, 2,6-dipropylphenyl isocyanate, and the like), aliphatic diisocyanate compounds (trimethylene diisocyanate, tetramethylene diisocyanate, hexamethylene diisocyanate, pentamethylene diisocyanate, 1,2-propylene diisocyanate, 1,3-butylene diisocyanate, dodecamethylene diisocyanate, 2,4,4-trimethylhexamethylene diisocyanate, and the like), alicyclic diisocyanate compounds (1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate, hydrogenated tetramethylxylylene diisocyanate, and the like), and aromatic diisocyanate compounds (phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate, xylylene diisocyanate, and the like)] by a known method, and, monomers obtained by reacting an alcohol having 1 to 26 carbon atoms (methanol, ethanol, propanol, isopropyl alcohol, butanol, t-butyl alcohol, pentanol, heptanol, octanol, 2-ethylhexanol, nonanol, decanol, undecyl alcohol, lauryl alcohol, dodecyl alcohol, myristyl alcohol, pentadecyl alcohol, cetanol, heptadecanol, stearyl alcohol, isostearyl alcohol, elaidyl alcohol, oleyl alcohol, linoleyl alcohol, linolenyl alcohol, nonadecyl alcohol, heneicosanol, behenyl alcohol, erucyl alcohol, and the like) with an isocyanate having 2 to 30 carbon atoms and having an ethylenically unsaturated bond [2-isocyanatoethyl (meth)acrylate, 2-(0-[1'-methylpropylideneamino]carboxyamino) ethyl (meth)acrylate, 2-[(3,5-dimethylpyrazolyl)carbonylamino]ethyl (meth)acrylate, 1,1-(bis(meth)acryloyloxymethyl)ethyl isocyanate, and the like] by a known method, and the like.

Monomers having a urea group: for example, monomers obtained by reacting an amine having 3 to 22 carbon atoms [primary amines (normal butylamine, t-butylamine, propylamine, isopropylamine, and the like), secondary amines (di-normal ethylamine, di-normal propylamine, di-n-butylamine, and the like), aniline, cycloxylamine, and the like] with an isocyanate having 2 to 30 carbon atoms and having an ethylenically unsaturated bond by a known method, and the like. Monomers having a carboxyl group: for example, methacrylic acid, acrylic acid, 2-carboxyethyl (meth)acrylate, and the like.

Macromonomers capable of forming the resin C are more preferably resins obtained by adding a (meth)acrylic acid ester having a glycidyl group to a polymer of an alkyl (meth)acrylate having from 12 to 30 (preferably from 18 to 26, more preferably from 20 to 24) carbon atoms in the alkyl moiety, a styrene-based monomer such as styrene, styrene derivative, and the like, and a monomer having a carboxyl group. Macromonomers capable of forming the resin C are even more preferably resins obtained by adding glycidyl (meth)acrylate to a polymer of an alkyl (meth)acrylate having from 12 to 30 (preferably from 18 to 26, more preferably from 20 to 24) carbon atoms in the alkyl moiety, styrene and (meth)acrylic acid. The number of unsaturated groups in the macromonomer is preferably 0.5 to 3.0, and more preferably 1.0 to 2.5. For example, the resin C may be a copolymer of such a macromonomer, styrene, and a (meth)acrylic acid alkyl ester having an alkyl group having 1 to 8 (preferably 1 to 6, more preferably 2 to 4) carbon atoms.

The number-average molecular weight Mn of the resin C or the macromonomer capable of forming the resin C is preferably 5000 to 10,000, more preferably 6000 to 8,000. The weight-average molecular weight Mw of the resin C or the macromonomer capable of forming the resin C is preferably 15,000 to 50,000, more preferably 25,000 to 35,000.

SA/SB and VAB/PB can be controlled by arbitrarily controlling the area SA, maximum value PA, half-value width and volume fraction CA of components derived from the resin A with the chloroform volume fraction of 50.0 to 75.0%, the area SB, maximum value PB, and volume fraction CB of components derived from the resin B with the chloroform volume fraction of 75.0 to 95.0%, and the minimum value VAB between the maximum value PA and the maximum value PB.

Next, a resin in the toner particle will be explained. The toner particle comprises a resin. The resin is, for example, a binder resin. The resin is preferably a vinyl resin. The resin A, resin B and resin C may be known resins as long as they satisfy formulas (1) and (2), and examples thereof include known binder resins such as vinyl resins, polyester resins, polyurethane resins and epoxy resins. Also, a hybrid resin in which a vinyl resin and a polyester resin are boned may be used. The resin A, resin B, and resin C are, for example, binder resins, preferably comprising a vinyl resin, and more preferably a vinyl resin.

Furthermore, the resin A, resin B, and resin C may have monomer units based on the following monomers in addition to the monomer units described above. Acrylic monomers such as acrylic acid and methacrylic acid; acrylic acid ester-based monomers and methacrylic acid ester-based monomers such as methyl acrylate, methyl methacrylate, ethyl acrylate, ethyl methacrylate, propyl acrylate, propyl methacrylate, butyl acrylate, butyl methacrylate, octyl acrylate, octyl methacrylate, dodecyl acrylate, dodecyl methacrylate, stearyl acrylate, stearyl methacrylate, behenyl acrylate, behenyl methacrylate, 2-ethylhexyl acrylate, 2-ethylhexyl methacrylate, dimethylaminoethyl acrylate, dimethylaminoethyl methacrylate, diethylaminoethyl methacrylate, and diethylaminoethyl methacrylate; aromatic vinyl monomers exemplified by styrene derivatives such as o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, and the like; and the like.

Furthermore, a cross-linking agent may be used to control the molecular weight of the resin. Examples of the cross-linking agent include bifunctional cross-linking agents such as divinylbenzene, bis(4-acryloxypolyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycol #200, #400, and #600, dipropylene glycol diacrylate, polypropylene glycol diacrylate, polyester type diacrylate (MANDA Nippon Kayaku Co., Ltd.), and those obtained by replacing the above diacrylate with dimethacrylate.

Examples of polyfunctional cross-linking agents include pentaerythritol triacrylate, trimethylolethane triacrylate, trimethylolpropane triacrylate, tetramethylolmethane tetraacrylate, oligoester acrylates, those obtained by replacing the above acrylate with methacrylate, 2,2-bis(4-methacryloxypolyethoxyphenyl)propane, diallyl phthalate, triallyl cyanurate, triallyl isocyanurate, triallyl trimellitate, and the like.

The toner particle may comprise a core particle having a resin and a shell covering the core particle. The resin forming the shell is not particularly limited, but vinyl resins or polyester resins are preferable from the viewpoint of charging stability. Amorphous polyester resins are more preferred. The shell does not necessarily cover the entire core, and the core may be partially exposed.

Release Agent

The toner may comprise a release agent. The release agent is preferably at least one selected from the group consisting of hydrocarbon waxes and ester waxes. By using hydrocarbon wax and/or ester wax, it becomes easier to ensure effective releasability.

The hydrocarbon wax is not particularly limited, and examples thereof include the following. Aliphatic hydrocarbon waxes: low-molecular-weight polyethylene, low-molecular-weight polypropylene, low-molecular-weight olefin copolymers, Fischer-Tropsch wax, or oxidized or acid-added waxes thereof.

The ester wax may have at least one ester bond in one molecule, and either natural ester wax or synthetic ester wax may be used. The ester wax is not particularly limited, and examples thereof include the following. Esters of monohydric alcohols and monocarboxylic acids, such as behenyl behenate, stearyl stearate, palmityl palmitate, and the like; esters of divalent carboxylic acids and monohydric alcohols, such as dibehenyl sebacate and the like; esters of dihydric alcohols and monocarboxylic acids, such as ethylene glycol distearate, hexanediol dibehenate, and the like; esters of trihydric alcohols and monocarboxylic acids, such as glycerin tribehenate, and the like; esters of tetrahydric alcohols and monocarboxylic acids, such as pentaerythritol tetrastearate, pentaerythritol tetrapalmitate, and the like; esters of hexahydric alcohols and monocarboxylic acids, such as dipentaerythritol hexastearate, dipentaerythritol hexapalmitate, dipentaerythritol hexabehenate, and the like; esters of polyfunctional alcohols and monocarboxylic acids, such as polyglycerin behenate and the like; and natural ester waxes such as carnauba wax, rice wax, and the like.

Among them, esters of hexahydric alcohols and monocarboxylic acids, such as dipentaerythritol hexastearate, dipentaerythritol hexapalmitate, dipentaerythritol hexabehenate, and the like are preferable.

As the release agent, a hydrocarbon wax or an ester wax may be used alone, a hydrocarbon wax and an ester wax may be used in combination, or two or more of each may be mixed and used, but it is preferable to use one type of hydrocarbon wax or two or more types of hydrocarbon waxes. More preferably, the release agent is a hydrocarbon wax.

The content of the release agent in the toner particle is preferably from 1.0 to 30.0% by mass, more preferably from 2.0 to 25.0% by mass. Where the content of the release agent in the toner particles is within the above ranges, it becomes easier to ensure releasability during fixing. The melting point of the release agent is preferably from 60 to 120° C. Where the melting point of the release agent is within the above range, the release agent is likely to melt during fixing and migrate out onto the toner particle surface, and the releasability is easily exhibited. More preferably, the melting point is from 70 to 100° C.

Colorant

The toner may comprise a colorant. Examples of the colorant include known organic pigments, organic dyes, inorganic pigments, carbon black as a black coloring agent, magnetic particles, and the like. In addition, colorants that are conventionally used in toners may be used. The following are examples of yellow colorants. Examples of yellow colorants include condensed azo compounds, isoindolinone compounds, anthraquinone compounds, azo metal complexes, methine compounds, and allylamide compounds. Specifically, C. I. Pigment Yellow 12, 13, 14, 15, 17, 62, 74, 83, 93, 94, 95, 109, 110, 111, 128, 129, 147, 155, 168 are preferably used.

The following are examples of magenta colorants. Examples of magenta colorants include condensation azo compounds, diketopyrrolopyrrole compounds, anthraquinone compounds, quinacridone compounds, basic dye lake compounds, naphthol compounds, benzimidazolone compounds, thioindigo compounds, perylene compounds. Specifically, C. I. Pigment Red 2, 3, 5, 6, 7, 23, 48:2, 48:3, 48:4, 57:1, 81:1, 122, 144, 146, 166, 169, 177, 184, 185, 202, 206, 220, 221, 254 are preferably used. The following are examples of cyan colorants. Examples of cyan colorants include copper phthalocyanine compounds and derivatives thereof, anthraquinone compounds, basic dye lake compound and the like. Specifically, C. I. Pigment Blue 1, 7, 15, 15:1, 15:2, 15:3, 15:4, 60, 62, 66 are preferably used.

The colorant is selected from the viewpoint of hue angle, chroma, brightness, light resistance, OHP transparency, and dispersibility in toner. The content of the colorant is preferably from 1.0 to 20.0 parts by mass with respect to 100.0 parts by mass of the resin. When magnetic particles are used as the colorant, the content thereof is preferably from 40.0 to 150.0 parts by mass with respect to 100.0 parts by mass of the resin.

Charge Control Agent

A charge control agent may be comprised in the toner particle as necessary. A charge control agent may also be externally added to the toner particle. By compounding the charge control agent, it becomes possible to stabilize the charge characteristics and control the optimum triboelectric charge quantity according to the development system. As the charge control agent, a known one can be used, and a charge control agent that has a high charging speed and can stably maintain a constant charge quantity is particularly preferable.

Examples of charge control agents that control the toner to be negatively charged include the following. Organometallic compounds and chelate compounds are effective, and examples thereof include monoazo metal compounds, acetylacetone metal compounds, and metal compounds of aromatic hydroxycarboxylic acids, aromatic dicarboxylic acids, hydroxycarboxylic acids and dicarboxylic acid. Examples of charge control agents that control the toner to be positively charged include the following. Nigrosine, quaternary ammonium salts, metal salts of higher fatty acids, diorganotin borates, guanidine compounds, and imidazole compounds. The content of the charge control agent is preferably from 0.01 to 20.0 parts by mass, more preferably 0.5 to 10.0 parts by mass with respect to 100.0 parts by mass of the toner particles.

External Additives

The toner particles may be used as they are as the toner or may be used as the toner after mixing an external additive or the like and attaching the external additive to the toner particle surface, if necessary. Examples of external additives include inorganic fine particles selected from the group consisting of silica fine particles, alumina fine particles, and titania fine particles, or composite oxides thereof. Examples of composite oxides include silica aluminum fine particles, strontium titanate fine particles, and the like. The content of the external additive is preferably from 0.01 to 8.0 parts by mass, more preferably from 0.1 to 4.0 parts by mass with respect to 100 parts by mass of the toner particles.

Next, a method of manufacturing the toner will be described in detail. The toner particles may be produced by any known method such as a suspension polymerization method, an emulsion aggregation method, a dissolution suspension method, and a pulverization method, as long as the particles are obtained within the scope of the present configuration. Among them, the suspension polymerization method is preferable because formulas (1) and (2) are easily satisfied.

The details of the suspension polymerization method will be described hereinbelow. For example, each polymerizable monomer that produces the resin A, a pre-synthesized resin B (crystalline resin that becomes resin B), a resin C (chloroform-insoluble resin that becomes resin C) or a macromonomer that can form a pre-synthesized resin C, and if necessary, other materials such as a colorant, a release agent, a charge control agent, and the like are mixed and uniformly dissolved or dispersed to prepare a polymerizable monomer composition. At least some of the polymerizable monomers may be premixed with the colorant. After that, the polymerizable monomer composition is dispersed in an aqueous medium using a stirring device or the like to prepare suspended particles of the polymerizable monomer composition. After that, the toner particles are obtained by polymerizing the polymerizable monomer comprised in the particles with an initiator or the like. After the polymerization is completed, the toner particles are preferably filtered, washed and dried by known methods, and if necessary, an external additive is added to obtain a toner.

A known polymerization initiator can be used as the polymerization initiator. Examples of the polymerization initiator include azo-based or diazo-based polymerization initiators such as 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobisisobutyronitrile, and the like; peroxide-based polymerization initiators such as benzoyl peroxide, t-butylperoxy 2-ethylhexanoate, t-butylperoxypivalate, t-butylperoxyisobutyrate, t-butylperoxyneodecanoate, methyl ethyl ketone peroxide, diisopropyl peroxycarbonate, cumene hydroperoxide, 2,4-dichlorobenzoyl peroxide, lauroyl peroxide, and the like. Also, known chain transfer agents and polymerization inhibitors may be used.

The aqueous medium may comprise an inorganic or organic dispersion stabilizer. A known dispersion stabilizer can be used as the dispersion stabilizer. Examples of inorganic dispersion stabilizers include phosphates such as hydroxyapatite, tricalcium phosphate, dicalcium phosphate, magnesium phosphate, aluminum phosphate, and zinc phosphate, carbonates such as calcium carbonate and magnesium carbonate, metal hydroxides such as calcium hydroxide, magnesium hydroxide, and aluminum hydroxide, sulfates such as calcium sulfate and barium sulfate, calcium metasilicate, bentonite, silica, and alumina.

Meanwhile, examples of organic dispersion stabilizers include polyvinyl alcohol, gelatin, methylcellulose, methylhydroxypropylcellulose, ethylcellulose, sodium salts of carboxymethylcellulose, polyacrylic acid and salts thereof, and starch.

When an inorganic compound is used as the dispersion stabilizer, a commercially available one may be used as it is, but in order to obtain finer particles, the above inorganic compound may be generated and used in an aqueous medium. For example, in the case of calcium phosphates such as hydroxyapatite and tribasic calcium phosphate, it is preferable to mix a phosphate aqueous solution and a calcium salt aqueous solution under high stirring.

The aqueous medium may comprise a surfactant. A known surfactant can be used as the surfactant. Examples thereof include anionic surfactants such as sodium dodecylbenzene sulfate and sodium oleate, cationic surfactants, amphoteric surfactants, and nonionic surfactants.

Methods for calculating and measuring various physical properties are described below.

Separation of Toner Particle from Toner

A toner particle obtained by separating a toner particle and an external additive by the following method can be used for each analysis. A total of 160 g of sucrose (manufactured by Kishida Chemical Co., Ltd.) is added to 100 mL of ion-exchanged water and dissolved in a water bath to prepare a sucrose concentrate. A total of 31 g of the sucrose concentrate and 6 mL of Contaminone N (10% by mass aqueous solution of a neutral detergent for cleaning precision measuring instruments that is composed of a nonionic surfactant, an anionic surfactant, and an organic builder and has pH 7, manufactured by Wako Pure Chemical Industries, Ltd.) are placed in a centrifuge tube to prepare a dispersion liquid. To this dispersion liquid, 1 g of toner is added, and toner lumps are loosened with a spatula or the like.

The centrifuge tube is set in the "KM Shaker ((model: V.SX) manufactured by Iwaki Sangyo Co., Ltd.)" and shaken for 20 min under the condition of 350 reciprocations per min. After shaking, the solution is transferred to a glass tube (50 mL) for a swing rotor, and centrifugation is performed under the conditions of 3500 rpm and 30 min with a centrifuge In the glass tube after centrifugation, toner particles are present in the uppermost layer, and the external additive such as silica fine particle is present on the aqueous solution side of the lower layer. The toner particles in the upper layer are collected, filtered, and washed with 2 L of running ion-exchanged water warmed to 40° C., and the washed toner particles are taken out.

Separation of Chloroform-Soluble Resin and Chloroform-Insoluble Resin from Toner Particle and Measurement of Content Ratio MC A total of 1.5 g of toner particles are accurately weighed (W1 [g]) and placed in a thimble (trade name: No. 86R, size 28×100 mm, manufactured by Advantec Toyo Co., Ltd.) accurately weighed in advance, and the thimble is set in a Soxhlet extractor. Using 200 mL of chloroform as a solvent, extraction is performed for 18 h at a reflux rate such that the extraction cycle of the solvent is realized every 5 min.

After the extraction is completed, the thimble is taken out and air-dried and then vacuum-dried at 40° C. for 8 h. The mass of the thimble containing the extraction residue is weighed, and the mass (W2 [g]) of the extraction residue is calculated by subtracting the mass of the thimble. When recovering the chloroform-soluble component, the recovery can be performed by sufficiently distilling off the chloroform from the soluble component in chloroform with an evaporator.

Next, the content (W3 [g]) of components other than the resin components is obtained by the following procedure. A total of 2 g of toner particles are accurately weighed (Wa [g]) into a 30 mL magnetic crucible that has been weighed in advance.

The magnetic crucible is placed in an electric furnace, heated at 900° C. for 3 h, allowed to cool in the electric furnace, and allowed to cool in a desiccator at room temperature for 1 h or more. The mass of the crucible containing the incineration ash residue is weighed, and the incineration ash residue content (Wb [g]) is calculated by subtracting the mass of the crucible. Then, the mass (W3 [g]) of the incineration ash residue in the sample W1 [g] is calculated by the following formula (A).

$$W3=W1\times(Wb/Wa) \quad (A)$$

Also, when the toner particle comprises a release agent, it is necessary to separate the resin and the release agent. Separation of the resin and the release agent is carried out by recycling HPLC to separate a component having a molecular weight of 2000 or less as a release agent and a component having a molecular weight of more than 2000 as a resin. The measurement method is described below.

First, the chloroform-soluble component is separated by the method described above and dissolved in chloroform. A sample solution is then obtained by filtering the obtained solution using a solvent-resistant membrane filter having a pore diameter of 0.2 μm (a "Mishoridisk" produced by Tosoh Corporation). The sample solution is adjusted so that the concentration of THF-soluble components is 1.0 mass %. Measurements are carried out using this sample solution under the following conditions.

Apparatus: LC-Sakura NEXT (produced by Japan Analytical Industry Co., Ltd.)

Column: JAIGEL2H, 4H (produced by Japan Analytical Industry Co., Ltd.)

Eluant: Chloroform

Flow rate: 10.0 mL/min

Oven temperature: 40° C.

Injected amount: 1.0 mL

To calculate the molecular weight of the sample, a molecular weight calibration curve is prepared using standard polystyrene resins (product names "TSK Standard Polystyrene F-850, F-450, F-288, F-128, F-80, F-40, F-20, F-10, F-4, F-2, F-1, A-5000, A-2500, A-1000 and A-500", produced by Tosoh Corporation).

From the molecular weight curve thus obtained, a component with a molecular weight of 2000 or less is repeatedly fractionated to separate the resin component (Wc) and release agent component (Wd) in the chloroform-soluble component of the toner particle. Then, the mass (W5) [g] of the resin component in the chloroform-soluble component (W4) in the sample W1 [g] is calculated by the following formulas.

$$W4=W1-W2$$

$$W5=W4\times(Wc/(Wc+Wd))$$

In this case, the content ratio of the chloroform-soluble component in the resin in the toner particle is obtained by the following formula.

$$\text{Content ratio of chloroform-soluble component in the resin in toner particle (\% by mass)}=W5/\{W5+(W2-W3)\}\times100.$$

Also, the content ratio MC (% by mass) of the resin C among the resins comprised in the toner particle is obtained by the following method. The content (W7 [g]) of components other than the resin components in the mass (W2 [g]) of the extraction residue, which is the chloroform-insoluble component of the toner particle, is determined by the following procedure. Chloroform-insoluble component of 2 g of toner particles is accurately weighed (Wa' [g]) into a 30-mL magnetic crucible that has been weighed in advance. The magnetic crucible is placed in an electric furnace, heated at about 900° C. for 3 h, allowed to cool in the electric furnace, and then allowed to cool in a desiccator at room temperature for 1 h or more. The mass of the crucible containing the incineration ash residue is weighed, and the incineration ash residue content (Wb' [g]) is calculated by subtracting the mass of the crucible.

Then, the mass (W7 [g]) of the incineration ash residue in the sample W2 [g] is calculated by the following formula (A').

$$W7=W2\times(Wb'/Wa') \quad (A')$$

Next, the mass (W8 [g]) of the resin C, which is the resin component excluding the incineration ash residue in the chloroform-insoluble component of the toner particle, is calculated by the following formula.

$$W8=W2-W7$$

Furthermore, MC (% by mass) is calculated by the following formula.

$$MC=W8/(W5+W8)\times100$$

Gradient LC Analysis Method for Resins and Calculation of Content Ratios of Resin A and Resin B The resin component (We) in the chloroform-soluble component of the toner particle obtained by the above method is used as a sample. The sample is adjusted to a sample concentration of 0.1% by mass with chloroform, and the resulting solution is filtered through a 0.45-μm PTFE filter and used for measurement. The gradient polymer LC measurement conditions are shown below.

Apparatus: UltiMate 3000 (manufactured by Thermo Fisher Scientific Inc.).

Mobile phase: A—chloroform (HPLC), B—acetonitrile (HPLC).

Gradient: 2 min (A/B=0/100)→25 min (A/B=100/0).

(The slope of the mobile phase change was made linear.)

Flow rate: 1.0 mL/min.

Injection: 0.1% by mass×20 μL.

Column: Tosoh TSKgel ODS (4.6 mmφ×150 mm×5 m).

Column temperature: 40° C.

Detector: Corona charged particle detector (Corona-CAD) (manufactured by Thermo Fisher Scientific Inc.).

Regarding the time-intensity graph obtained in the measurement, after converting the time into the ratio of chloroform, the peak area of the ratio of chloroform below is calculated. Where the S/N ratio of the signal intensity is not sufficient, an appropriate moving average is taken for the volume fraction of chloroform to improve the S/N ratio of the signal intensity. Specifically, the results were calculated using the results obtained by taking the moving average in the range of chloroform volume fraction of 3% and smoothing the signal.

Then, the area when the ratio (volume fraction) of chloroform in the mobile phase is 50.0 to 75.0% by volume is defined as SA, the maximum value is defined as PA, the half-value width of the maximum value PA is defined as HPA, and the volume fraction of the maximum value PA is defined as CA. In addition, the area when the ratio of chloroform in the mobile phase is 75.0 to 95.0% by volume is defined as SB, the maximum value is defined as PB, the chloroform volume fraction of the maximum value PB is defined as CB, and the minimum value between the maximum value PA and the maximum value PB is defined as VAB. For example, in the case of a peak at a chloroform ratio of 5.0 to 95.0% by volume, the area of the range enclosed by a vertical axis at 5.0% by volume, a vertical axis at 95.0% by volume, the intensity curve and the horizontal axis (intensity 0) may be calculated.

For the content of resin A and resin B, the developing solution in the gradient LC is collected, and extraction is performed by defining the developing solution when the chloroform volume fraction is 50.0 to 75.0% by volume as a chloroform solution of resin A and defining the developing solution when the chloroform volume fraction is 75.0 to 95.0% by volume as a chloroform solution of resin B. The test is performed by repeating the extraction until the amount sufficient for analysis is reached. The solvent is removed from the extracted solutions of resin A and resin B to obtain the resin A and the resin B comprised in the toner, and composition analysis of the resin A and the resin B is performed. Further, the composition of the entire chloroform-soluble component of the toner particle is analyzed, and the composition ratio of resin A and resin B to the chloroform-soluble component of the toner particle is calculated. By multiplying the content ratio (% by mass) of the chloroform-soluble component in the resins in the toner particle by the composition ratio of the resin A or the resin B, the ratios being calculated by the above method, MA (% by mass), which is the content ratio of the resin A among the resins comprised in the toner particle, and MB (% by mass), which is the content ratio of the resin B, are calculated.

Measurement of Glass Transition Point (Tga) of Resin A

The glass transition point is measured according to ASTM D3418-82 using a differential scanning calorimeter "Q2000" (manufactured by TA Instruments). The melting points of indium and zinc are used to correct the temperature of the detection unit of the device, and the heat of fusion of indium is used to correct the amount of heat. Specifically, 3 mg of resin is accurately weighed and placed in an aluminum pan, and measurement is performed under the following conditions using an empty aluminum pan as a reference.

Heating rate: 10° C./min.

Measurement start temperature: 30° C.

Measurement end temperature: 180° C.

The measurement is performed at a heating rate of 10° C./min within the measurement range of 30 to 180° C. The temperature is raised to 180° C., held for 10 min, then lowered to 30° C., and then raised again. In the second heating process, a change in specific heat is obtained in the temperature range of 30 to 100° C. The intersection point of the differential thermal curve and the line between the midpoints of the baselines before and after the change in specific heat occurs is defined as the glass transition temperature (Tg) of the resin.

Method for Measuring Endothermic Peak Temperature (Tmb, Tmc)

The peak temperature of the endothermic peak of the resin is measured using DSC Q2000 (manufactured by TA Instruments) under the following conditions.

Heating rate: 10° C./min.

Measurement start temperature: 20° C.

Measurement end temperature: 180° C.

The melting points of indium and zinc are used to correct the temperature of the detection unit of the device, and the heat of fusion of indium is used to correct the amount of heat. Specifically, 1.0 mg of a sample is accurately weighed, placed in an aluminum pan, and subjected to differential scanning calorimetry. An empty silver pan is used as a reference. As the temperature rising process, the temperature is raised to 180° C. at a rate of 10° C./min. Then, the peak temperature is calculated from each peak.

Method for Measuring Content Ratio of Various Monomer Units in Resin

The content ratios of various monomer units in the resin A, resin B and resin C are measured by $^1$H-NMR under the following conditions.

Measuring device: FT NMR device JNM-EX400 (manufactured by JEOL Ltd.).

Measurement frequency: 400 MHz.

Pulse condition: 5.0 s.

Frequency range: 10,500 Hz.

Cumulative number of times: 64 times.

Measurement temperature: 30° C.

Sample: 50 mg of a sample to be measured is placed in a sample tube with an inner diameter of 5 mm, deuterated chloroform ($CDCl_3$) is added as a solvent, and the solvent is prepared by dissolving in a thermostat at 40° C.

The resin B will be described below as an example.

From the obtained $^1$H-NMR chart, among the peaks attributed to the constituent elements of the monomer unit (a), a peak independent of the peaks attributed to the constituent elements of the other monomer units is selected, and the integrated value $S_1$ of this peak is calculated. In the case where the resin B comprises the second monomer unit, similarly, among the peaks attributed to the constituent elements of the second monomer unit, a peak independent of the peaks attributed to the constituent elements of the other monomer units is selected, and the integrated value $S_2$ of this peak is calculated. Furthermore, when the third and fourth monomer units are comprised, among the peaks attributed to the constituent elements of the third and fourth monomer units, peaks independent of the peaks attributed to the constituent elements of other monomer units are selected, and the integrated values $S_3$ and $S_4$ of these peaks are calculated.

The content ratio of the monomer unit (a) is obtained in the following manner by using the integrated values $S_1$, $S_2$, $S_3$ and $S_4$. $n_1$, $n_2$, $n_3$, and $n_4$ are the numbers of hydrogen atoms in the constituent elements to which the peaks of attention are attributed for each segment.

$$\text{Content ratio (mol \%) of monomer unit } (a)=\{(S_1/n_1)/((S_1/n_1)+(S_2/n_2)+(S_3/n_3)+(S_4/n_4))\}\times 100.$$

Similarly, the ratios of the second, third, and fourth monomer units are obtained as follows.

$$\text{Content ratio (mol \%) of the second monomer unit}=\{(S_2/n_2)/((S_1/n_1)+(S_2/n_2)+(S_3/n_3)+(S_4/n_4))\}\times 100.$$

$$\text{Content ratio (mol \%) of the third monomer unit}=\{(S_3/n_3)/((S_1/n_1)+(S_2/n_2)+(S_3/n_3)+(S_4/n_4))\}\times 100.$$

$$\text{Content ratio (mol \%) of the fourth monomer unit}=\{(S_4/n_4)/((S_1/n_1)+(S_2/n_2)+(S_3/n_3)+(S_4/n_4))\}\times 100.$$

Where a polymerizable monomer that does not have a hydrogen atom is used as a constituent element other than the vinyl group in the resin, $^{13}$C-NMR is used to set the atomic nucleus to be measured to $^{13}$C, the measurement is performed in the single pulse mode, and calculations are performed in the same manner as in $^1$H-NMR. The measurement can be similarly performed with respect to the resin A and resin C. In addition, when the toner is produced by the suspension polymerization method, the peaks of the release agent and the shell resin may overlap, and independent peaks may not be observed. As a result, the content ratio of each unit in the binder resin may not be calculated. In that case, resin' can be produced by performing similar suspension polymerization without using a release agent or other resins, and the resin' can be analyzed as a resin.

Method for Measuring Molecular Weight of Resin

The molecular weight (weight-average molecular weight Mw, number-average molecular weight Mn) of the THF-soluble component of the resin is measured by gel permeation chromatography (GPC) in the following manner. First, the sample is dissolved in tetrahydrofuran (THF) at room temperature for 24 h. A sample solution is then obtained by filtering the obtained solution using a solvent-resistant membrane filter having a pore diameter of 0.2 μm (a "Myshoridisk" produced by Tosoh Corporation). The sample solution is adjusted so that the concentration of THF-soluble components is 0.8 mass %. Measurements are carried out using this sample solution under the following conditions.

Apparatus: HLC8120 GPC (detector: RI) (produced by Tosoh Corporation)

Column: Shodex KF-801, 802, 803, 804, 805, 806, 807, seven series (produced by Showa Denko Kabushiki Kaisha)

Eluant: Tetrahydrofuran (THF)

Flow rate: 1.0 mL/min

Oven temperature: 40.0° C.

Injected amount: 0.10 mL

To calculate the molecular weight of the sample, a molecular weight calibration curve is prepared using standard polystyrene resins (product names "TSK Standard Polystyrene F-850, F-450, F-288, F-128, F-80, F-40, F-20, F-10, F-4, F-2, F-1, A-5000, A-2500, A-1000 and A-500", produced by Tosoh Corporation).

Measurement of Acid Value AVa of Resin A and Acid Value AVb of Resin B

The acid value is the number of milligrams of potassium hydroxide required to neutralize the acid contained in 1 g of sample. The acid value of the binder resin is measured according to JIS K 0070-1992, and more specifically, the acid value is measured according to the following procedure.

(1) Preparation of Reagents

A phenolphthalein solution is obtained by dissolving 1.0 g of phenolphthalein in 90 mL of ethyl alcohol (95% by volume) and adding ion-exchanged water to make 100 mL. A total of 7 g of special grade potassium hydroxide is dissolved in 5 mL of water, and ethyl alcohol (95% by volume) is added to make 1 L. The mixture is placed in an alkali-resistant container so as not to come into contact with carbon dioxide gas and the like, and is allowed to stand for 3 days, followed by filtration to obtain a potassium hydroxide solution. The resulting potassium hydroxide solution is stored in an alkali-resistant container. A total of 25 mL of 0.1 mol/L hydrochloric acid is taken in an Erlenmeyer flask, a few drops of the phenolphthalein solution are added, titration is performed with the potassium hydroxide solution, and the factor of the potassium hydroxide solution is determined from the amount of the potassium hydroxide solution required for neutralization. The 0.1 mol/L hydrochloric acid used is prepared according to JIS K 8001-1998.

(2) Operation (A) Main Test

A total of 2.0 g of the sample is accurately weighed in a 200 mL Erlenmeyer flask, 100 mL of a mixed solution of toluene/ethanol (2:1) is added, and dissolution is performed for 5 h. Next, a few drops of the phenolphthalein solution are added as an indicator, and the potassium hydroxide solution is used for titration. The end point of titration is when the light red color of the indicator continues for 30 sec.

(B) Blank Test

The titration is performed in the same manner as in the operation, except that no sample is used (that is, only a mixed solution of toluene/ethanol (2:1) is used).

The result obtained in (3) is substituted into the following formula to calculate the acid value.

$$A=[(C-B)\times f\times 5.61]/S$$

Here, A: acid value (mg KOH/g), B: addition amount of potassium hydroxide solution in the blank test (mL), C: addition amount of potassium hydroxide solution in the main test (mL), f: potassium hydroxide solution factor, S: mass of the sample (g).

EXAMPLE

The present disclosure will be described in more detail hereinbelow with reference to Examples, but the invention is not limited thereto. Unless otherwise specified, the parts used in the examples are based on mass.

(Method for Synthesizing Additive Resin B1)

The following materials were put into a reaction vessel equipped with a reflux condenser, a stirring device, a thermometer, and a nitrogen introduction tube under a nitrogen atmosphere.

| | |
|---|---|
| Toluene | 100.0 parts |
| Monomer composition | 100.0 parts |

(The monomer composition is a mixture of the following monomers in the ratios shown below.)

(Behenyl acrylate (monomer (a)) 80.0 parts)
(Styrene 18.0 parts)
(Methacrylic acid 2.0 parts)
Polymerization initiator (manufactured by Wako Pure Chemical Industries, Ltd.: V-65) 0.5 parts The polymerization reaction was carried out for 12 h by heating to 70° C., while stirring the inside of the reaction vessel at 200 rpm, to obtain a solution in which the polymer of the monomer composition was dissolved in toluene. Subsequently, after the temperature of the solution was lowered to 25° C., the solution was poured into 1000.0 parts of methanol under stirring to precipitate the methanol-insoluble component. The obtained methanol-insoluble component was separated by filtration, washed with methanol, and vacuum-dried at 40° C. for 24 h to obtain an additive resin B1.

Preparation of Additive Resins B2 to B25

Additive resins B2 to B25 were prepared in the same manner as in the synthesis of additive resin B1, except that the addition amount of the monomer composition was changed as shown in Table 1, and the addition amount of the initiator and the reaction time were changed so that the molecular weight was as shown in Table 1.

TABLE 1

| | Polymerizable monomer | | | | | |
|---|---|---|---|---|---|---|
| | | Addition | Molecular weight | | | |
| | Type of monomer | amount (parts) | Mn | Mw | Tm | Av |
| Additive Resin B1 | St/BEA/MAA | 18.5/80.0/1.5 | 7500 | 24000 | 64.0 | 6.5 |
| Additive Resin B2 | St/BEA/MAA | 48.5/50.0/1.5 | 7300 | 24200 | 51.5 | 6.5 |
| Additive Resin B3 | St/BEA/MAA | 43.5/55.0/1.5 | 7500 | 23800 | 54.0 | 7.1 |
| Additive Resin B4 | St/BEA/MAA | 53.5/45.0/1.5 | 7200 | 24100 | 48.0 | 6.8 |
| Additive Resin B5 | St/BEA/MAA | 17.5/80.0/2.5 | 4500 | 12000 | 58.0 | 10.3 |
| Additive Resin B6 | St/BEA/MAA | 17.5/80.0/2.5 | 9500 | 31000 | 67.0 | 10.3 |
| Additive Resin B7 | St/BEA/MAA | 17.5/80.0/2.5 | 12000 | 37800 | 67.0 | 10.5 |
| Additive Resin B8 | St/BEA/MAA | 17.5/80.0/2.5 | 12500 | 47500 | 68.0 | 10.3 |
| Additive Resin B9 | St/BEA | 30.0/70.0 | 11000 | 34000 | 57.0 | 0.0 |
| Additive Resin B10 | St/BEA/MAA | 29.2/70.0/0.8 | 10500 | 32000 | 58.0 | 3.5 |
| Additive Resin B11 | St/BEA/MAA | 28.8/70.0/1.2 | 10700 | 33000 | 62.0 | 5.5 |
| Additive Resin B12 | St/BEA/MAA | 27.5/70.0/2.5 | 9800 | 32000 | 62.0 | 11.0 |
| Additive Resin B13 | St/BEA/MAA | 25.5/70.0/4.5 | 9500 | 31500 | 64.0 | 21.5 |
| Additive Resin B14 | St/BEA/MAA | 25.0/70.0/5.0 | 10200 | 31000 | 64.5 | 25.5 |
| Additive Resin B15 | St/BEA/MAA | 24.3/70.0/5.7 | 10300 | 33000 | 64.0 | 29.0 |
| Additive Resin B16 | St/BEA/MAA | 24.0/70.0/6.0 | 10500 | 31000 | 65.0 | 31.2 |
| Additive Resin B17 | BEA/MAA | 97.5/2.5 | 7500 | 23500 | 76.0 | 11.0 |
| Additive Resin B18 | St/BEA/MAA | 3.5/94.0/2.5 | 7400 | 24000 | 72.0 | 10.9 |
| Additive Resin B19 | St/BEA/MAA | 46.5/50.0/3.5 | 10500 | 34000 | 52.0 | 16.0 |
| Additive Resin B20 | St/BEA/LAA/MAA | 28.5/48.0/23.0/3.5 | 8500 | 33800 | 51.0 | 16.1 |
| Additive Resin B21 | St/BEA/LAA/MAA | 38.5/35.0/23.0/3.5 | 8300 | 34200 | 41.0 | 17.3 |
| Additive Resin B22 | St/BEA/LAA/MAA | 41.5/30.0/25.0/3.5 | 7900 | 34100 | 34.0 | 16.1 |
| Additive Resin B23 | St/STA/MAA | 17.5/80.0/2.5 | 12500 | 36500 | 42.0 | 10.1 |
| Additive Resin B24 | St/STA/MAA | 42.5/55.0/2.5 | 12500 | 36500 | 36.0 | 10.1 |
| Additive Resin B25 | St/LAA/MAA | 17.5/80.0/2.5 | 11900 | 36000 | No melting point | 10.3 |

In the table, Mn is the number-average molecular weight, Mw is the weight-average molecular weight, Tm is the melting point (° C.), and Av is the acid value (mg KOH/g).

Abbreviations of monomers in the table are as follows.

St: styrene
BEA: behenyl acrylate
MAA: methacrylic acid
LAA: lauryl acrylate
STA: stearyl acrylate (Method for Synthesizing Additive Resin C1)

The following materials were put into a reaction vessel equipped with a reflux condenser, a stirring device, a thermometer, and a nitrogen introduction tube under a nitrogen atmosphere.

| | |
|---|---|
| Toluene | 100.0 parts |
| Monomer composition | 100.0 parts |

(The monomer composition is a mixture of the following monomers in the ratios shown below.)

(Behenyl acrylate (monomer (a)) 80.0 parts)
(Styrene 19.2 parts)
(Methacrylic acid 0.8 parts)
lymerization initiator (manufactured by Wako Pure Chemical Industries, Ltd.: V-65) 0.5 parts The polymerization reaction was carried out for 12 h by heating to 70° C., while stirring the inside of the reaction vessel at 200 rpm, to obtain a solution in which the polymer of the monomer composition was dissolved in toluene.

Furthermore, in order to deactivate the polymerization initiator, the nitrogen introduction tube was removed, the temperature was raised to 85° C., and heating was conducted for another 6 h. After that, 0.05 parts of triethylamine and 1.3 parts of glycidyl methacrylate were added and an addition reaction was carried out for 5 h. Subsequently, after the temperature of the solution was lowered to 25° C., the solution was poured into 1000.0 parts of methanol under stirring to precipitate the methanol-insoluble component matter. The obtained methanol-insoluble component matter was separated by filtration, washed with methanol, and vacuum-dried at 40° C. for 24 h to obtain an additive resin C1.

Preparation of Additive Resins C2 to C9

Additive resins C2 to C9 were prepared in the same manner as in the preparation of additive resin C1, except that the addition amount of the monomer composition was changed as shown in Table 2, and the addition amount of glycidyl methacrylate was changed so that the number of unsaturated groups was as shown in Table 2.

TABLE 2

| | Polymerizable monomer | | | Molecular weight | | |
|---|---|---|---|---|---|---|
| | Type of monomer | Addition amount (parts) | Type of iniciator | Mn | Mw | The number of unsaturated groups |
| Additive resin C1 | St/BEA/MAA | 17.5/80.0/0.8 | V-65 | 7000 | 32000 | 1.7 |
| Additive resin C2 | St/BEA/MAA | 17.5/80.0/0.4 | V-65 | 6800 | 31000 | 0.7 |
| Additive resin C3 | St/BEA/MAA | 17.5/80.0/1.2 | V-65 | 7300 | 29000 | 2.2 |
| Additive resin C4 | St/BEA/MAA | 17.5/80.0/1.2 | V-65 | 5400 | 20000 | 1.1 |
| Additive resin C5 | St/STA/MAA | 17.5/80.0/1.2 | V-65 | 7500 | 31000 | 2.2 |
| Additive resin C6 | St/LAA/MAA | 17.5/80.0/1.2 | V-65 | 7300 | 30000 | 2.2 |
| Additive resin C7 | St/BEA | 20.0/80.0 | VA-057 | 7500 | 32000 | 1.2 |
| Additive resin C8 | St/BEA | 20.0/80.0 | VA-057 | 7500 | 32000 | 0.6 |
| Additive resin C9 | St/BEA/MAN | 10.0/70.0/20.0 | V-65 | 7500 | 34500 | 0 |

Abbreviations of monomers in the table are as follows.

St: styrene

BEA: behenyl acrylate

MAA: methacrylic acid

LAA: lauryl acrylate

STA: stearyl acrylate

MAN: methacrylonitrile

The number of unsaturated groups was determined using the number-average molecular weight (Mn) determined by gel permeation chromatography (GPC) and the molecular weight (M_NMR) determined by nuclear magnetic resonance spectroscopy ($^1$H-NMR). The measurement conditions for nuclear magnetic resonance spectroscopy ($^1$H-NMR) [400 MHz, $CDCl_3$, room temperature (25° C.)] were as follows.

Measuring device: FT NMR device JNM-EX400 (manufactured by JEOL Ltd.).

Measurement frequency: 400 MHz.

Pulse condition: 5.0 s.

Frequency range: 10,500 Hz.

Cumulative number of times: 64 times.

From the integrated value of the obtained spectrum, the composition ratio of the constituting monomers per one unsaturated group can be obtained. The NMR molecular weight (M_NMR) can be calculated as the molecular weight per one unsaturated group from the composition ratio and molecular weight of the monomers. Furthermore, from the number-average molecular weight (Mn) obtained from gel permeation chromatography (GPC) and the NMR molecular weight (M_NMR) obtained from the NMR, the number of unsaturated groups per macromonomer molecule can be calculated by the following formula.

$$\text{Number of unsaturated groups} = \text{GPC number-average molecular weight } (Mn)/\text{NMR molecular weight } (M\_NMR).$$

Production of Toner by Suspension Polymerization

| (Production of Toner Particles 1) | |
|---|---|
| Styrene | 47.0 parts |
| n-Butyl acrylate | 20.0 parts |
| Colorant Pigment Blue 15:3 | 6.5 parts |

A mixture of the above materials was prepared. The mixture was put into an attritor (manufactured by Nippon Coke Co., Ltd.) and dispersed at 200 rpm for 2 h using zirconia beads with a diameter of 5 mm to obtain a raw material dispersion liquid.

Meanwhile, 735.0 parts of ion-exchanged water and 16.0 parts of trisodium phosphate (12-hydrate) were added to a container equipped with a high-speed stirring device Homomixer (manufactured by Primix Corporation) and a thermometer, and the temperature was raised to 60° C. while stirring at 12,000 rpm. A calcium chloride aqueous solution prepared by dissolving 9.0 parts of calcium chloride (dihydrate) in 65.0 parts of ion-exchanged water was added thereto, and stirring was performed at 12,000 rpm for 30 min while maintaining the temperature at 60° C. Then, 10% hydrochloric acid was added to adjust the pH to 6.0 to obtain an aqueous medium in which an inorganic dispersion stabilizer containing hydroxyapatite was dispersed in water.

Subsequently, the raw material dispersion liquid was transferred to a container equipped with a stirring device and a thermometer, and the temperature was raised to 60° C. while stirring at 100 rpm.

| | |
|---|---|
| Additive resin B1 | 26.0 parts |
| Additive resin C1 | 7.0 parts |
| Release agent 1 | 9.0 parts |
| (Release agent 1: DP18 (dipentaerythritol stearate wax, melting point 79° C., manufactured by Nippon Seiro Co., Ltd.) | |

After adding the above materials and stirring at 100 rpm for 30 min while maintaining the temperature at 60° C., 9.0 parts of t-butyl peroxypivalate (PERBUTYL PV, manufactured by NOF Corporation:) was added as a polymerization initiator. After further stirring for 1 min, the mixture was put into the aqueous medium being stirred at 15,000 rpm in the high-speed stirring device. The stirring was continued at 15,000 rpm for 20 min with the high-speed stirring device while maintaining the temperature at 60° C. to obtain a granulation liquid.

The granulation liquid was transferred to a reaction vessel equipped with a reflux condenser, a stirring device, a thermometer, and a nitrogen introduction tube, and the temperature was raised to 70° C. while stirring at 150 rpm under a nitrogen atmosphere. A polymerization reaction was carried out at 150 rpm for 12 h while maintaining the temperature at 70° C. to obtain a toner particle dispersion liquid. After cooling the obtained toner particle dispersion liquid to 45° C. while stirring at 150 rpm, heat treatment was performed for 5 h while maintaining the temperature at 45° C. Thereafter, while stirring was maintained, dilute hydrochloric acid was added until the pH reached 1.5 to dissolve the dispersion stabilizer. The solid content was separated by filtration, thoroughly washed with ion-exchanged water, and vacuum-dried at 30° C. for 24 h to obtain toner particles 1. Table 3-1 shows the method for producing toner particles 1.

Production of Toner Particles 2-48 and Comparative Toner Particles 1-7

Toner particles 2 to 48 and comparative toner particles 1 to 6 were produced in the same manner as in the production of toner particles 1, except that the addition amounts of the monomer composition and additive resins were changed as shown in Tables 3-1 and 3-2.

The comparative toner particles 7 were produced as follows.

| | |
|---|---|
| Polyester resin<br>(Propylene oxide-modified bisphenol A (2 mol adduct), polycondensate of terephthalic acid and trimellitic acid (molar ratios 10.0:10.0:0.3), glass transition temperature Tg = 67° C., weight-average molecular weight Mw = 10,500, molecular weight distribution Mw/Mn = 4.72) | 50.0 parts |
| Additive resin B1 | 50.0 parts |
| Release agent<br>(Release agent: DP18 (dipentaerythritol stearate wax, melting point 79° C., manufactured by Nippon Seiro Co., Ltd.) | 9.0 parts |
| Colorant (Pigment Blue 15:3) | 6.5 parts |

The above materials were pre-mixed with a Henschel mixer (manufactured by Nippon Coke Co., Ltd.) and then melt-kneaded with a twin-screw kneading extruder (PCM-30 type, manufactured by Ikegai Tekko Co., Ltd.).

The resulting kneaded product was cooled, coarsely pulverized with a hammer mill, and then pulverized with a mechanical pulverizer (T-250, manufactured by Turbo Kogyo Co., Ltd.), and the resulting finely pulverized powder was classified with a multi-division classifier using the Coanda effect to obtain comparative toner particles 7.

TABLE 3-1

| Toner particle No. | Polymerizable monomer: Type of monomer | Polymerizable monomer: Addition amount (parts) | Additive resin B: Type of resin | Additive resin B: Addition amount (parts) | Additive resin C: Type of resin | Additive resin C: Addition amount (parts) |
|---|---|---|---|---|---|---|
| 1 | St/BA | 47.0/20.0 | Additive resin B1 | 26.0 | Additive resin C1 | 7.0 |
| 2 | St/BA | 30.0/37.0 | Additive resin B1 | 26.0 | Additive resin C1 | 7.0 |
| 3 | St/BA | 34.0/33.0 | Additive resin B1 | 26.0 | Additive resin C1 | 7.0 |
| 4 | St/BA | 34.0/33.0 | Additive resin B2 | 26.0 | Additive resin C1 | 7.0 |
| 5 | St/BA | 58.0/9.0 | Additive resin B4 | 26.0 | Additive resin C1 | 7.0 |
| 6 | St/BA | 39.5/17.5 | Additive resin B7 | 33.0 | Additive resin C9 | 10.0 |
| 7 | St/BA | 39.5/17.5 | Additive resin B23 | 33.0 | Additive resin C9 | 10.0 |
| 8 | St/BA | 39.5/17.5 | Additive resin B25 | 33.0 | Additive resin C9 | 10.0 |
| 9 | St/BA | 47.0/20.0 | Additive resin B1 | 31.0 | Additive resin C1 | 2.0 |
| 10 | St/BA | 47.0/20.0 | Additive resin B1 | 30.0 | Additive resin C1 | 3.0 |
| 11 | St/BA | 47.0/20.0 | Additive resin B1 | 28.0 | Additive resin C1 | 5.0 |
| 12 | St/BA | 47.0/20.0 | Additive resin B1 | 24.0 | Additive resin C1 | 9.0 |
| 13 | St/BA | 47.0/20.0 | Additive resin B1 | 21.0 | Additive resin C1 | 12.0 |
| 14 | St/LAA | 44.0/23.0 | Additive resin B3 | 26.0 | Additive resin C1 | 7.0 |
| 15 | St/LAA | 47.0/20.0 | Additive resin B3 | 26.0 | Additive resin C1 | 7.0 |
| 16 | St/EA/MMA | 20.0/18.0/29.0 | Additive resin B3 | 26.0 | Additive resin C1 | 7.0 |
| 17 | St/EA/MMA | 16.5/21.0/29.5 | Additive resin B3 | 26.0 | Additive resin C1 | 7.0 |
| 18 | St/BA | 39.5/17.5 | Additive resin B9 | 33.0 | Additive resin C9 | 10.0 |
| 19 | St/BA | 39.5/17.5 | Additive resin B10 | 33.0 | Additive resin C9 | 10.0 |
| 20 | St/BA | 39.5/17.5 | Additive resin B11 | 33.0 | Additive resin C9 | 10.0 |
| 21 | St/BA | 39.5/17.5 | Additive resin B12 | 33.0 | Additive resin C9 | 10.0 |
| 22 | St/BA/MAA | 38.7/18.2/0.1 | Additive resin B13 | 33.0 | Additive resin C9 | 10.0 |
| 23 | St/BA/MAA | 38.6/18.2/0.2 | Additive resin B14 | 33.0 | Additive resin C9 | 10.0 |
| 24 | St/BA/MAA | 38.5/18.2/0.3 | Additive resin B15 | 33.0 | Additive resin C9 | 10.0 |
| 25 | St/BA/MAA | 44.0/19.7/0.3 | Additive resin B16 | 26.0 | Additive resin C9 | 10.0 |
| 26 | St/BA | 46.0/21.0 | Additive resin B1 | 23.0 | Additive resin C1 | 10.0 |
| 27 | St/BA | 38.5/17.5 | Additive resin B1 | 34.0 | Additive resin C1 | 10.0 |
| 28 | St/BA | 34.5/15.5 | Additive resin B1 | 40.0 | Additive resin C1 | 10.0 |
| 29 | St/BA | 46.0/21.0 | Additive resin B1 | 23.0 | Additive resin C9 | 10.0 |
| 30 | St/BA | 45.0/20.0 | Additive resin B1 | 25.0 | Additive resin C9 | 10.0 |
| 31 | St/BA | 32.5/15.0 | Additive resin B1 | 47.5 | Additive resin C9 | 5.0 |
| 32 | St/BA | 31.0/14.0 | Additive resin B1 | 50.0 | Additive resin C9 | 5.0 |
| 33 | St/BA | 46.0/21.0 | Additive resin B17 | 26.0 | Additive resin C1 | 7.0 |
| 34 | St/BA | 46.0/21.0 | Additive resin B18 | 26.0 | Additive resin C1 | 7.0 |
| 35 | St/BA | 46.0/21.0 | Additive resin B19 | 26.0 | Additive resin C1 | 7.0 |
| 36 | St/BA | 40.0/18.0 | Additive resin B20 | 35.0 | Additive resin C1 | 7.0 |
| 37 | St/BA | 40.0/18.0 | Additive resin B21 | 35.0 | Additive resin C1 | 7.0 |
| 38 | St/BA | 40.0/18.0 | Additive resin B22 | 35.0 | Additive resin C1 | 7.0 |
| 39 | St/BA | 47.0/20.0 | Additive resin B1 | 26.0 | Additive resin C3 | 7.0 |
| 40 | St/BA | 47.0/20.0 | Additive resin B1 | 26.0 | Additive resin C5 | 7.0 |
| 41 | St/BA | 47.0/20.0 | Additive resin B1 | 26.0 | Additive resin C6 | 7.0 |
| 42 | St/BA | 47.0/20.0 | Additive resin B5 | 26.0 | Additive resin C4 | 9.0 |

TABLE 3-1-continued

| Toner particle No. | Polymerizable monomer: Type of monomer | Polymerizable monomer: Addition amount (parts) | Additive resin B: Type of resin | Additive resin B: Addition amount (parts) | Additive resin C: Type of resin | Additive resin C: Addition amount (parts) |
|---|---|---|---|---|---|---|
| 43 | St/BA | 47.0/20.0 | Additive resin B6 | 26.0 | Additive resin C4 | 9.0 |
| 44 | St/BA | 47.0/20.0 | Additive resin B8 | 26.0 | Additive resin C4 | 9.0 |
| 45 | St/BA | 47.0/20.0 | Additive resin B1 | 26.0 | Additive resin C4 | 9.0 |
| 46 | St/BA | 47.0/20.0 | Additive resin B1 | 26.0 | Additive resin C2 | 15.0 |
| 47 | St/BA | 47.0/20.0 | Additive resin B1 | 26.0 | Additive resin C7 | 15.0 |
| 48 | St/BA | 47.0/20.0 | Additive resin B1 | 26.0 | Additive resin C8 | 15.0 |

TABLE 3-2

| Toner particle No. | Polymerizable monomer: Type of monomer | Polymerizable monomer: Addition amount (parts) | Additive resin B: Type of resin | Additive resin B: Addition amount (parts) | Additive resin C: Type of resin | Additive resin C: Addition amount (parts) |
|---|---|---|---|---|---|---|
| Comparative 1 | St/BA | 52.5/22.5 | | | Additive resin C7 | 25.0 |
| Comparative 2 | St/BA | 35.0/15.0 | | | Additive resin C8 | 50.0 |
| Comparative 3 | St/BA | 42.5/17.5 | Additive resin B22 | 33.0 | Additive resin C1 | 7.0 |
| Comparative 4 | St/BA | 24.0/11.0 | Additive resin B1 | 55.0 | Additive resin C1 | 10.0 |
| Comparative 5 | St/BEA/HDDA | 48.5/50.0/1.5 | | | | |
| Comparative 6 | St/BA/MMA/MAA | 27.0/27.0/10.0/3.0 | Additive resin B24 | 26.0 | Additive resin C1 | 7.0 |
| Comparative 7 | | | *polyester resin | 50.0 | Additive resin B1 | 50.0 |

Abbreviations of monomers in the table are as follows.

St: styrene

BA: n-butyl acrylate

MAA: methacrylic acid

LAA: lauryl acrylate

STA: stearyl acrylate

MAN: methacrylonitrile

Tables 4-1 and 4-2 show the results of gradient LC analysis of the obtained toner particles 1 to 48 and comparative toner particles 1 to 7, and Tables 5-1 and 5-2 show the analysis results of the fractionated resins A, B and C.

TABLE 4-1

| | Ratio | | Area | | Intensity of maximum value/minimum value | | | Half-value width | Chloroform volume fraction | | |
|---|---|---|---|---|---|---|---|---|---|---|---|
| | SA/SB | VAB/PB | SA | SB | PA | PB | VAB | HPA | CA | CB | CV |
| Toner particle 1 | 0.74 | 0.39 | 39.2 | 53.3 | 4.2 | 2.9 | 1.1 | 6.8 | 65.3 | 86.0 | 75.3 |
| Toner particle 2 | 0.74 | 0.39 | 39.2 | 53.2 | 3.0 | 2.9 | 1.1 | 9.5 | 65.4 | 86.0 | 75.6 |
| Toner particle 3 | 0.74 | 0.40 | 39.0 | 53.0 | 3.4 | 2.8 | 1.1 | 8.5 | 65.3 | 86.1 | 76.1 |
| Toner particle 4 | 0.74 | 0.49 | 39.0 | 53.0 | 3.4 | 2.3 | 1.1 | 8.5 | 65.6 | 80.0 | 72.5 |
| Toner particle 5 | 0.74 | 0.48 | 39.1 | 53.1 | 5.2 | 2.4 | 1.1 | 5.5 | 65.4 | 78.1 | 71.8 |
| Toner particle 6 | 0.49 | 0.30 | 30.4 | 61.6 | 3.6 | 3.7 | 1.1 | 6.8 | 64.5 | 88.0 | 76.7 |
| Toner particle 7 | 0.49 | 0.29 | 30.6 | 61.9 | 3.6 | 3.9 | 1.1 | 6.8 | 64.3 | 85.1 | 74.3 |
| Toner particle 8 | 0.49 | 0.27 | 30.5 | 61.8 | 3.6 | 4.2 | 1.1 | 6.8 | 65.0 | 88.1 | 76.0 |
| Toner particle 9 | 0.62 | 0.36 | 35.1 | 56.8 | 4.2 | 3.4 | 1.2 | 6.8 | 65.4 | 86.1 | 76.1 |
| Toner particle 10 | 0.64 | 0.36 | 35.7 | 56.0 | 4.2 | 3.3 | 1.2 | 6.8 | 65.5 | 86.0 | 76.2 |
| Toner particle 11 | 0.68 | 0.37 | 37.4 | 54.7 | 4.2 | 3.1 | 1.2 | 6.8 | 65.5 | 86.0 | 75.2 |
| Toner particle 12 | 0.80 | 0.45 | 40.8 | 51.1 | 4.2 | 2.6 | 1.2 | 6.8 | 65.3 | 86.0 | 75.9 |
| Toner particle 13 | 0.84 | 0.54 | 43.7 | 52.1 | 4.2 | 2.3 | 1.2 | 6.8 | 65.3 | 86.0 | 75.6 |
| Toner particle 14 | 0.74 | 0.48 | 38.9 | 52.8 | 3.0 | 2.4 | 1.1 | 9.5 | 73.1 | 82.1 | 78.3 |
| Toner particle 15 | 0.74 | 0.47 | 39.2 | 53.2 | 3.2 | 2.4 | 1.1 | 9.0 | 71.5 | 82.0 | 77.5 |
| Toner particle 16 | 0.74 | 0.47 | 38.9 | 52.8 | 2.4 | 2.4 | 1.1 | 12.2 | 54.1 | 82.0 | 68.2 |
| Toner particle 17 | 0.74 | 0.48 | 38.9 | 52.8 | 2.1 | 2.4 | 1.1 | 13.5 | 51.5 | 82.0 | 67.4 |
| Toner particle 18 | 0.49 | 0.27 | 30.3 | 61.5 | 3.6 | 4.2 | 1.1 | 6.8 | 65.9 | 85.0 | 75.2 |
| Toner particle 19 | 0.49 | 0.30 | 30.6 | 61.9 | 3.6 | 3.8 | 1.1 | 6.8 | 65.4 | 84.6 | 75.4 |
| Toner particle 20 | 0.49 | 0.31 | 30.5 | 61.8 | 3.6 | 3.6 | 1.1 | 6.8 | 65.4 | 84.1 | 74.4 |
| Toner particle 21 | 0.49 | 0.31 | 30.5 | 61.7 | 3.6 | 3.6 | 1.1 | 6.8 | 65.2 | 83.0 | 73.9 |
| Toner particle 22 | 0.49 | 0.33 | 30.3 | 61.4 | 3.3 | 3.4 | 1.1 | 7.5 | 65.4 | 80.0 | 72.6 |
| Toner particle 23 | 0.49 | 0.34 | 30.4 | 61.7 | 3.0 | 3.3 | 1.1 | 8.1 | 65.6 | 79.0 | 72.0 |
| Toner particle 24 | 0.49 | 0.36 | 30.5 | 61.8 | 2.9 | 3.2 | 1.1 | 8.5 | 65.4 | 78.1 | 71.9 |
| Toner particle 25 | 0.70 | 0.43 | 38.1 | 54.2 | 3.2 | 2.3 | 1.0 | 8.5 | 65.8 | 77.0 | 72.0 |
| Toner particle 26 | 0.83 | 0.47 | 41.7 | 50.1 | 4.2 | 2.6 | 1.2 | 6.8 | 64.5 | 86.0 | 75.6 |
| Toner particle 27 | 0.47 | 0.43 | 29.4 | 62.5 | 3.5 | 3.8 | 1.6 | 6.8 | 64.5 | 86.1 | 75.6 |
| Toner particle 28 | 0.36 | 0.41 | 24.3 | 67.9 | 3.2 | 4.5 | 1.9 | 6.8 | 64.6 | 86.0 | 75.8 |

TABLE 4-1-continued

| | Ratio | | Area | | Intensity of maximum value/minimum value | | | Half-value width | Chloroform volume fraction | | |
|---|---|---|---|---|---|---|---|---|---|---|---|
| | SA/SB | VAB/PB | SA | SB | PA | PB | VAB | HPA | CA | CB | CV |
| Toner particle 29 | 0.83 | 0.35 | 42.0 | 50.4 | 4.2 | 2.6 | 0.9 | 6.8 | 64.6 | 86.0 | 74.9 |
| Toner particle 30 | 0.74 | 0.34 | 39.3 | 52.9 | 4.1 | 2.8 | 0.9 | 6.8 | 64.5 | 86.1 | 75.4 |
| Toner particle 31 | 0.32 | 0.27 | 20.4 | 63.7 | 3.0 | 5.4 | 1.5 | 6.8 | 64.6 | 86.0 | 75.7 |
| Toner particle 32 | 0.31 | 0.27 | 18.7 | 60.5 | 2.8 | 5.6 | 1.5 | 6.8 | 64.5 | 86.1 | 75.3 |
| Toner particle 33 | 0.74 | 0.34 | 39.0 | 53.0 | 4.2 | 3.4 | 1.1 | 6.8 | 64.6 | 89.1 | 76.4 |
| Toner particle 34 | 0.74 | 0.35 | 39.0 | 53.0 | 4.2 | 3.3 | 1.1 | 6.8 | 64.6 | 88.1 | 76.7 |
| Toner particle 35 | 0.74 | 0.32 | 39.1 | 53.1 | 4.2 | 3.6 | 1.2 | 6.8 | 65.0 | 77.1 | 71.2 |
| Toner particle 36 | 0.47 | 0.47 | 29.6 | 62.4 | 3.7 | 2.9 | 1.4 | 6.8 | 65.1 | 83.0 | 74.4 |
| Toner particle 37 | 0.47 | 0.50 | 29.6 | 62.6 | 3.7 | 2.7 | 1.4 | 6.8 | 65.1 | 81.0 | 73.4 |
| Toner particle 38 | 0.47 | 0.53 | 29.6 | 62.6 | 3.7 | 2.5 | 1.4 | 6.8 | 65.1 | 79.1 | 72.2 |
| Toner particle 39 | 0.74 | 0.42 | 39.2 | 53.2 | 4.2 | 2.9 | 1.2 | 6.8 | 65.0 | 86.0 | 76.1 |
| Toner particle 40 | 0.74 | 0.42 | 39.1 | 53.0 | 4.2 | 2.9 | 1.2 | 6.8 | 65.0 | 86.1 | 75.1 |
| Toner particle 41 | 0.74 | 0.42 | 39.1 | 53.1 | 4.2 | 2.9 | 1.2 | 6.8 | 65.0 | 86.0 | 75.3 |
| Toner particle 42 | 0.71 | 0.43 | 38.2 | 53.5 | 4.1 | 2.6 | 1.1 | 6.8 | 65.4 | 86.1 | 76.4 |
| Toner particle 43 | 0.71 | 0.35 | 38.5 | 53.9 | 4.1 | 3.2 | 1.1 | 6.8 | 65.4 | 86.1 | 75.9 |
| Toner particle 44 | 0.71 | 0.34 | 38.4 | 53.7 | 4.1 | 3.3 | 1.1 | 6.8 | 65.3 | 86.0 | 75.7 |
| Toner particle 45 | 0.71 | 0.34 | 38.2 | 53.5 | 4.1 | 3.3 | 1.1 | 6.8 | 65.3 | 86.1 | 75.8 |
| Toner particle 46 | 0.65 | 0.38 | 36.1 | 55.7 | 3.7 | 3.3 | 1.2 | 6.8 | 65.4 | 86.0 | 75.9 |
| Toner particle 47 | 0.65 | 0.44 | 36.1 | 55.7 | 3.7 | 3.3 | 1.4 | 6.8 | 65.3 | 86.0 | 75.2 |
| Toner particle 48 | 0.65 | 0.34 | 36.1 | 55.7 | 3.7 | 3.3 | 1.1 | 6.8 | 65.4 | 86.1 | 75.3 |

TABLE 4-2

| | Ratio | | Area | | Intensity of maximum value/minimum value | | | Half-value width | Chloroform volume fraction | | |
|---|---|---|---|---|---|---|---|---|---|---|---|
| | SA/SB | VAB/PB | SA | SB | PA | PB | VAB | HPA | CA | CB | CV |
| Comparative toner particle 1 | 0.72 | 0.18 | 42.0 | 58.3 | 4.7 | 3.4 | 0.6 | 6.8 | 65.1 | 86.0 | 76.1 |
| Comparative toner particle 2 | 0.89 | 0.38 | 33.0 | 26.6 | 3.2 | 3.4 | 0.9 | 6.8 | 65.1 | 86.0 | 74.9 |
| Comparative toner particle 3 | 0.52 | 0.57 | 31.6 | 60.8 | 3.8 | 3.4 | 1.9 | 6.8 | 65.1 | 79.1 | 72.6 |
| Comparative toner particle 4 | 0.25 | 0.45 | 44.7 | 47.6 | 4.3 | 3.4 | 1.6 | 6.8 | 64.5 | 86.1 | 75.3 |
| Comparative toner particle 5 | Only the maximum value at chloroform volume fraction of 84.0% by volume, half-value width 22.0% | | | | | | | | | | |
| Comparative toner particle 6 | Maximum values at chloroform volume fractions of 59.0% by volume and 64.2% by volume, minimum value at a volume fraction of 62.2%. | | | | | | | | | | |
| Comparative toner particle 7 | Maximum values at chloroform volume fractions of 38.0% by volume and 86.0% by volume, minimum value at a volume fraction of 47.1%. | | | | | | | | | | |

TABLE 5-1

| Toner particle No. | MA + MB + MC | Resin A | | | Resin B | | | | | Resin C | | |
|---|---|---|---|---|---|---|---|---|---|---|---|---|
| | | MA | Tga | Ava | MB | Tmb | Long-chain alkyl | Content ratio of unit (a) | Avb | MC | Tmc | Long-chain alkyl |
| 1 | 78.1 | 40.1 | 52.1 | 0.0 | 21.8 | 62.1 | BEA | 87.3 | 6.3 | 16.3 | 55.0 | BEA |
| 2 | 78.0 | 40.2 | 38.0 | 0.0 | 21.9 | 62.0 | BEA | 87.3 | 6.3 | 15.9 | 47.0 | BEA |
| 3 | 77.7 | 40.8 | 42.1 | 0.0 | 22.2 | 62.0 | BEA | 87.3 | 6.3 | 14.8 | 50.0 | BEA |
| 4 | 77.9 | 40.4 | 42.6 | 0.0 | 22.0 | 51.1 | BEA | 70.6 | 6.3 | 15.5 | 43.0 | BEA |
| 5 | 77.9 | 40.5 | 64.1 | 0.0 | 22.0 | 48.0 | BEA | 66.0 | 7.6 | 15.3 | 52.0 | BEA |
| 6 | 73.7 | 40.7 | 52.1 | 0.0 | 33.0 | 62.0 | BEA | 87.3 | 4.9 | 0.0 | — | None |
| 7 | 73.7 | 40.7 | 41.0 | 0.0 | 33.0 | 42.0 | STA | 85.4 | 5.7 | 0.0 | — | None |
| 8 | 73.7 | 40.7 | 43.1 | 0.0 | 33.0 | — | LAA | 0.0 | 7.9 | 0.0 | — | None |
| 9 | 79.3 | 46.8 | 52.1 | 0.0 | 30.3 | 62.0 | BEA | 87.3 | 6.3 | 2.3 | 60.0 | BEA |
| 10 | 78.6 | 46.2 | 52.1 | 0.0 | 29.0 | 62.1 | BEA | 87.3 | 6.3 | 3.4 | 58.0 | BEA |
| 11 | 78.0 | 43.6 | 52.1 | 0.0 | 25.5 | 62.1 | BEA | 87.3 | 6.3 | 8.8 | 56.0 | BEA |
| 12 | 79.0 | 35.7 | 54.0 | 0.0 | 17.9 | 62.0 | BEA | 87.3 | 6.3 | 25.3 | 54.0 | BEA |
| 13 | 81.8 | 28.0 | 52.1 | 0.0 | 12.3 | 62.0 | BEA | 87.3 | 6.3 | 41.5 | 53.0 | BEA |
| 14 | 78.2 | 40.0 | 45.0 | 0.0 | 21.7 | 57.0 | BEA | 75.1 | 6.1 | 16.5 | 52.0 | BEA |
| 15 | 77.9 | 40.5 | 49.0 | 0.0 | 22.0 | 57.1 | BEA | 75.1 | 6.1 | 15.4 | 52.0 | BEA |
| 16 | 78.0 | 40.3 | 59.0 | 0.0 | 21.9 | 57.1 | BEA | 75.1 | 6.1 | 15.7 | 55.0 | BEA |

TABLE 5-1-continued

| Toner particle No. | MA + MB + MC | Resin A MA | Resin A Tga | Resin A Ava | Resin B MB | Resin B Tmb | Resin B Long-chain alkyl | Resin B Content ratio of unit (a) | Resin B Avb | Resin C MC | Resin C Tmc | Resin C Long-chain alkyl |
|---|---|---|---|---|---|---|---|---|---|---|---|---|
| 17 | 78.0 | 40.3 | 56.0 | 0.0 | 21.9 | 57.1 | BEA | 75.1 | 6.1 | 15.8 | 53.0 | BEA |
| 18 | 73.7 | 40.7 | 52.0 | 0.0 | 33.0 | 53.1 | BEA | 82.9 | 0.0 | 0.0 | — | None |
| 19 | 73.7 | 40.7 | 52.1 | 0.0 | 33.0 | 55.1 | BEA | 83.0 | 3.2 | 0.0 | — | None |
| 20 | 73.7 | 40.7 | 52.0 | 0.0 | 33.0 | 59.1 | BEA | 83.0 | 5.4 | 0.0 | — | None |
| 21 | 73.7 | 40.7 | 52.1 | 0.0 | 33.0 | 63.0 | BEA | 83.2 | 10.8 | 0.0 | — | None |
| 22 | 73.7 | 40.7 | 52.0 | 1.8 | 33.0 | 66.0 | BEA | 83.5 | 21.1 | 0.0 | — | None |
| 23 | 73.7 | 40.7 | 52.0 | 2.7 | 33.0 | 66.0 | BEA | 83.6 | 25.3 | 0.0 | — | None |
| 24 | 73.7 | 40.7 | 52.1 | 4.5 | 33.0 | 69.0 | BEA | 83.6 | 28.1 | 0.0 | — | None |
| 25 | 71.7 | 45.7 | 52.0 | 4.5 | 26.0 | 68.0 | BEA | 83.7 | 30.3 | 0.0 | — | None |
| 26 | 79.9 | 33.0 | 52.1 | 0.0 | 15.9 | 62.0 | BEA | 87.3 | 6.3 | 31.0 | 54.0 | BEA |
| 27 | 82.2 | 27.4 | 52.1 | 0.0 | 23.3 | 62.1 | BEA | 87.3 | 6.3 | 31.5 | 55.0 | BEA |
| 28 | 83.4 | 24.5 | 52.0 | 0.0 | 27.4 | 62.1 | BEA | 87.3 | 6.3 | 31.5 | 53.0 | BEA |
| 29 | 70.9 | 47.9 | 52.1 | 0.0 | 23.0 | 62.0 | BEA | 87.3 | 6.3 | 0.0 | — | None |
| 30 | 71.4 | 46.4 | 52.1 | 0.0 | 25.0 | 62.1 | BEA | 87.3 | 6.3 | 0.0 | — | None |
| 31 | 81.4 | 33.9 | 52.1 | 0.0 | 47.5 | 62.0 | BEA | 87.3 | 6.3 | 0.0 | — | None |
| 32 | 82.1 | 32.1 | 52.1 | 0.0 | 50.0 | 62.1 | BEA | 87.3 | 6.3 | 0.0 | — | None |
| 33 | 77.8 | 40.6 | 52.0 | 0.0 | 22.0 | 76.0 | BEA | 95.4 | 10.9 | 15.2 | 57.0 | BEA |
| 34 | 77.9 | 40.4 | 52.1 | 0.0 | 22.0 | 72.0 | BEA | 93.9 | 10.4 | 15.5 | 58.0 | BEA |
| 35 | 77.9 | 40.5 | 52.0 | 0.0 | 22.0 | 52.0 | BEA | 71.3 | 15.8 | 15.4 | 53.0 | BEA |
| 36 | 80.2 | 34.9 | 52.0 | 0.0 | 29.5 | 42.1 | BEA/LAA | 61.5 | 15.5 | 15.8 | 47.0 | BEA |
| 37 | 80.0 | 35.2 | 52.1 | 0.0 | 29.7 | 41.1 | BEA/LAA | 51.3 | 16.2 | 15.1 | 44.0 | BEA |
| 38 | 80.0 | 35.1 | 52.0 | 0.0 | 29.6 | 38.1 | BEA/LAA | 47.7 | 15.5 | 15.3 | 42.0 | BEA |
| 39 | 80.2 | 36.2 | 52.0 | 0.0 | 19.7 | 62.0 | BEA | 87.3 | 6.3 | 24.3 | 47.0 | BEA |
| 40 | 80.2 | 36.2 | 52.1 | 0.0 | 19.7 | 60.5 | BEA | 87.3 | 6.3 | 24.3 | 46.0 | STA |
| 41 | 80.3 | 36.1 | 52.0 | 0.0 | 19.6 | 57.0 | BEA | 87.3 | 6.3 | 24.5 | 42.0 | LAA |
| 42 | 76.2 | 40.2 | 52.1 | 0.0 | 22.5 | 57.0 | BEA | 87.3 | 6.3 | 13.5 | 55.0 | BEA |
| 43 | 76.1 | 40.2 | 52.1 | 0.0 | 22.5 | 64.1 | BEA | 87.3 | 6.3 | 13.4 | 55.0 | BEA |
| 44 | 76.2 | 40.0 | 52.1 | 0.0 | 22.4 | 65.1 | BEA | 87.3 | 6.3 | 13.8 | 55.0 | BEA |
| 45 | 76.2 | 40.0 | 52.0 | 0.0 | 22.4 | 65.0 | BEA | 87.3 | 6.3 | 13.8 | 55.0 | BEA |
| 46 | 76.1 | 31.6 | 52.1 | 0.0 | 19.5 | 65.0 | BEA | 87.3 | 6.3 | 25.0 | 55.0 | BEA |
| 47 | 79.3 | 27.4 | 52.1 | 0.0 | 16.9 | 65.1 | BEA | 87.3 | 6.3 | 35.0 | 55.0 | BEA |
| 48 | 72.9 | 35.8 | 52.0 | 0.0 | 22.1 | 65.1 | BEA | 87.3 | 6.3 | 15.0 | 55.0 | BEA |

TABLE 5-2

| Toner particle No. | MA + MB + MC | Resin A MA | Resin A Tga | Resin A Ava | Resin B MB | Resin B Tmb | Resin B Long-chain alkyl | Resin B Content ratio of unit (a) | Resin B Avb | Resin C MC | Resin C Tmc | Resin C Long-chain alkyl |
|---|---|---|---|---|---|---|---|---|---|---|---|---|
| Comparative 1 | 84.1 | 53.5 | 52.3 | 0.0 | 8.1 | 64.3 | BEA | 89.8 | 0.0 | 22.5 | 54.0 | BEA |
| Comparative 2 | 83.3 | 30.3 | 52.4 | 0.0 | 20.5 | 63.5 | BEA | 89.3 | 0.0 | 32.5 | 53.0 | BEA |
| Comparative 3 | 79.6 | 36.3 | 52.0 | 0.0 | 28.0 | 38.0 | BEA | 47.7 | 15.5 | 15.3 | 42.0 | BEA |
| Comparative 4 | 79.5 | 34.0 | 52.0 | 0.0 | 14.5 | 62.1 | BEA | 89.5 | 7.9 | 31.0 | 54.0 | BEA |
| Comparative 5 | — | Resin with a BEA weight fraction of 62.0% by weight, melting point 61° C., insoluble MC 23.0% by weight | | | | | | | | | | |
| Comparative 6 | — | First maximum value: 35.3% by weight/Tg = 51.5° C. Second maximum value: 33.0% by weight/Tm = 38.1° C. | | | | | | | 9.5 | 14.5 | 48.0 | BEA |
| Comparative 7 | — | First maximum value: 40.5% by weight/Tg = 55.5° C. Second maximum value: 45.3% by weight/Tm = 62.1° C. | | | | | | | 6.1 | 3.5 | No melting point | *PES |

In the table, "Long-chain alkyl" indicates a monomer that forms a monomer unit of a (meth)acrylic acid alkyl ester having a long-chain alkyl comprised in each resin. "Content ratio of unit (a)" indicates the content ratio of the monomer unit (a) represented by formula (3).

Example 1

Evaluation of Toner Particles 1

A total of 2.0 parts of silica fine particles (hydrophobized with hexamethyldisilazane, number-average particle size of primary particles: 10 nm, BET specific surface area: 170 $m^2/g$) were added as an external additive to 100.0 parts of the toner particles 1, and mixing was performed at 3000 rpm for 15 min using a Henschel mixer (manufactured by Nippon Coke Co., Ltd.) to obtain a toner 1. The obtained toner was evaluated according to the following evaluation methods.

Toner Evaluation Methods

<1> Evaluation of Fixing Performance

The process cartridge filled with the toner was allowed to stand at 25° C. and 40% RH for 48 h. Using LBP-712Ci modified to operate even if the fixing device is removed, an unfixed image having an image pattern in which square images of 10 mm×10 mm were evenly arranged at 9 points on the transfer paper was output. The toner laid-on level on the transfer paper was set to 0.80 mg/$cm^2$, and the fixing lower-limit temperature and the fixing upper-limit temperature were evaluated while changing the fixing temperature within the range from 100° C. to 220° C. at intervals of 5° C. As the transfer paper, A4 paper ("Plover Bond Paper": 105 g/$m^2$, manufactured by Fox River Paper Co.) was used.

The fixing device of LBP-712Ci was removed to the outside, and an external fixing device was used so as to enable operation outside the laser beam printer. Fixing with the external fixing device was performed by increasing the fixing temperature from 90° C. by 5° C., and the process speed was 320 mm/sec. The fixed image was visually checked, the lowest fixing temperature at which no cold offset occurred was defined as the fixing lower-limit temperature, and the highest temperature at which no hot offset occurred was defined as the fixing upper-limit temperature. As the low-temperature lower-limit temperature, 160° C. or less was determined to be excellent in terms of low-temperature fixability. Further, the difference between the fixing lower-limit temperature and the fixing upper-limit temperature was taken as the fixing latitude, and where the fixing latitude of 40° C. or more could be ensured, it was determined to be excellent in terms of fixing performance.

<2> Evaluation of Charging Stability

Durability was evaluated using a commercially available Canon printer LBP-712Ci. The evaluation cartridge was prepared for use by removing the toner contained in the commercially available cartridge, cleaning the inside with an air blow, and then loading 200 g of the toner to be evaluated. The cartridge was allowed to stand in an environment of 25° C. and 40% RH for 48 h and then was mounted on a cyan station and evaluated for durability.

As a charge stability evaluation under a high-temperature and high-humidity environment, an initial solid white image was printed using Canon Oce Red Label (80 g/$m^2$) under an environment of 30° C. and 80% RH, and the fogging density was measured. After that, in order to evaluate the degree of leakage, 3000 sheets with horizontal line pattern images with a print percentage of 1% were continuously output, and then the printer was allowed to stand for 12 h or more. After that, a solid white image was printed, and the fogging density was measured.

As a charge stability evaluation under a low-temperature and low-humidity environment, an initial solid white image was printed using Canon Oce Red Label (80 g/$m^2$) under an environment of 15° C. and 10% RH, and the fogging density was measured. After that, in order to evaluate the degree of leakage, 3000 sheets with horizontal line pattern images with a print percentage of 1% were continuously output. Immediately after that, a solid white image was printed, and the fogging density was measured.

For the measurement of fogging density, "REFLECTOMETER MODEL TC-6DS" (manufactured by Tokyo Denshoku Co., Ltd.) was used, and the fogging density (%) was calculated from the difference between the whiteness of the white background portion of the printed solid white image and the whiteness of the transfer paper. An amber filter was used as the filter. Where the fogging density was 2.5% or less, it was determined to be excellent in terms of charging stability.

Table 6-1 shows the evaluation results of toner 1.

TABLE 6-1

| | | Fixing evaluation | | | Evaluation in high-temperature and high-humidity environment | | Evaluation in low-temperature and low-humidity environment | |
|---|---|---|---|---|---|---|---|---|
| | | | | | | Fogging after printing | | Fogging immediately |
| Example No. | Toner particle | Lower-limit temperature (° C.) | Upper-limit temperature (° C.) | Latitude | Initial fogging value | 3000 sheets and allowing to stand | Initial fogging value | after printing 3000 sheets |
| 1 | Toner particle 1 | 110 | 200 | 90 | 0.2 | 0.3 | 0.2 | 0.1 |
| 2 | Toner particle 2 | 110 | 200 | 90 | 0.2 | 0.6 | 0.2 | 0.1 |
| 3 | Toner particle 3 | 110 | 200 | 90 | 0.2 | 0.5 | 0.2 | 0.1 |
| 4 | Toner particle 4 | 115 | 190 | 75 | 0.2 | 0.9 | 0.2 | 0.2 |
| 5 | Toner particle 5 | 120 | 180 | 60 | 0.2 | 1.2 | 0.2 | 0.2 |
| 6 | Toner particle 6 | 105 | 170 | 65 | 0.2 | 0.3 | 0.2 | 1.0 |
| 7 | Toner particle 7 | 115 | 170 | 55 | 0.2 | 0.6 | 0.2 | 1.5 |
| 8 | Toner particle 8 | 130 | 170 | 40 | 0.2 | 1.2 | 0.2 | 1.6 |
| 9 | Toner particle 9 | 110 | 175 | 65 | 0.2 | 0.3 | 0.2 | 0.2 |
| 10 | Toner particle 10 | 110 | 180 | 70 | 0.2 | 0.2 | 0.2 | 0.2 |
| 11 | Toner particle 11 | 115 | 195 | 80 | 0.2 | 0.2 | 0.2 | 0.2 |
| 12 | Toner particle 12 | 140 | 215 | 75 | 0.1 | 0.1 | 0.1 | 0.2 |
| 13 | Toner particle 13 | 155 | 215 | 60 | 0.2 | 1.6 | 0.2 | 1.6 |
| 14 | Toner particle 14 | 125 | 205 | 80 | 0.4 | 1.0 | 0.2 | 0.2 |
| 15 | Toner particle 15 | 130 | 205 | 75 | 0.3 | 0.7 | 0.2 | 0.3 |
| 16 | Toner particle 16 | 120 | 205 | 85 | 0.1 | 0.1 | 0.2 | 0.8 |
| 17 | Toner particle 17 | 125 | 205 | 80 | 0.1 | 0.1 | 0.2 | 1.2 |
| 18 | Toner particle 18 | 110 | 165 | 55 | 0.1 | 0.2 | 0.2 | 2.1 |
| 19 | Toner particle 19 | 110 | 165 | 55 | 0.2 | 0.1 | 0.2 | 1.7 |
| 20 | Toner particle 20 | 110 | 165 | 55 | 0.2 | 0.1 | 0.2 | 0.7 |
| 21 | Toner particle 21 | 110 | 165 | 55 | 0.1 | 0.2 | 0.3 | 0.4 |
| 22 | Toner particle 22 | 105 | 165 | 60 | 0.3 | 0.5 | 0.3 | 0.1 |
| 23 | Toner particle 23 | 105 | 165 | 60 | 0.3 | 0.8 | 0.1 | 0.8 |
| 24 | Toner particle 24 | 110 | 170 | 60 | 0.1 | 1.4 | 0.1 | 1.2 |
| 25 | Toner particle 25 | 115 | 170 | 55 | 0.2 | 1.9 | 0.2 | 1.2 |
| 26 | Toner particle 26 | 145 | 210 | 65 | 0.2 | 0.8 | 0.2 | 2.1 |
| 27 | Toner particle 27 | 125 | 205 | 80 | 0.4 | 0.8 | 0.2 | 0.8 |

TABLE 6-1-continued

| Example No. | Toner particle | Fixing evaluation: Lower-limit temperature (° C.) | Fixing evaluation: Upper-limit temperature (° C.) | Fixing evaluation: Latitude | Evaluation in high-temperature and high-humidity environment: Initial fogging value | Evaluation in high-temperature and high-humidity environment: Fogging after printing 3000 sheets and allowing to stand | Evaluation in low-temperature and low-humidity environment: Initial fogging value | Evaluation in low-temperature and low-humidity environment: Fogging immediately after printing 3000 sheets |
|---|---|---|---|---|---|---|---|---|
| 28 | Toner particle 28 | 110 | 195 | 85 | 0.5 | 1.8 | 0.2 | 0.6 |
| 29 | Toner particle 29 | 135 | 175 | 40 | 0.2 | 0.4 | 0.1 | 2.2 |
| 30 | Toner particle 30 | 130 | 175 | 45 | 0.2 | 0.2 | 0.2 | 0.3 |
| 31 | Toner particle 31 | 105 | 165 | 60 | 0.2 | 2.1 | 0.2 | 1.7 |
| 32 | Toner particle 32 | 105 | 155 | 50 | 0.2 | 2.4 | 0.2 | 2.0 |
| 33 | Toner particle 33 | 140 | 180 | 40 | 0.2 | 0.2 | 0.2 | 0.3 |
| 34 | Toner particle 34 | 125 | 195 | 70 | 0.2 | 0.2 | 0.2 | 0.2 |
| 35 | Toner particle 35 | 130 | 200 | 70 | 0.2 | 0.2 | 0.3 | 0.2 |
| 36 | Toner particle 36 | 120 | 185 | 65 | 0.5 | 1.2 | 0.2 | 0.2 |
| 37 | Toner particle 37 | 135 | 195 | 60 | 0.9 | 1.8 | 0.3 | 0.2 |
| 38 | Toner particle 38 | 155 | 205 | 50 | 1.0 | 2.0 | 0.2 | 0.3 |
| 39 | Toner particle 39 | 115 | 200 | 85 | 0.3 | 0.5 | 0.1 | 0.3 |
| 40 | Toner particle 40 | 130 | 210 | 80 | 0.7 | 1.0 | 0.2 | 0.2 |
| 41 | Toner particle 41 | 145 | 210 | 65 | 1.3 | 2.3 | 0.1 | 0.3 |
| 42 | Toner particle 42 | 115 | 200 | 85 | 0.2 | 0.5 | 0.2 | 0.1 |
| 43 | Toner particle 43 | 125 | 205 | 80 | 0.1 | 0.3 | 0.2 | 0.2 |
| 44 | Toner particle 44 | 135 | 205 | 70 | 0.2 | 0.2 | 0.1 | 0.3 |
| 45 | Toner particle 45 | 135 | 210 | 75 | 0.2 | 0.2 | 0.1 | 0.3 |
| 46 | Toner particle 46 | 125 | 195 | 70 | 0.2 | 0.2 | 0.1 | 0.3 |
| 47 | Toner particle 47 | 140 | 200 | 60 | 0.2 | 0.2 | 0.1 | 0.3 |
| 48 | Toner particle 48 | 140 | 190 | 50 | 0.2 | 0.2 | 0.1 | 0.3 |

TABLE 6-2

| Example No. | Toner particle | Fixing evaluation: Lower-limit temperature (° C.) | Fixing evaluation: Upper-limit temperature (° C.) | Fixing evaluation: Latitude | Evaluation in high-temperature and high-humidity environment: Initial fogging value | Evaluation in high-temperature and high-humidity environment: Fogging after printing 3000 sheets and allowing to stand | Evaluation in low-temperature and low-humidity environment: Initial fogging value | Evaluation in low-temperature and low-humidity environment: Fogging immediately after printing 3000 sheets |
|---|---|---|---|---|---|---|---|---|
| Comparative 1 | Comparative toner particle 1 | 125 | 175 | 50 | 0.2 | 0.2 | 0.2 | 3.5 |
| Comparative 2 | Comparative toner particle 2 | 115 | 145 | 30 | 0.5 | 1.1 | 0.2 | 3.3 |
| Comparative 3 | Comparative toner particle 3 | 155 | 200 | 45 | 1.6 | 3.4 | 0.2 | 0.5 |
| Comparative 4 | Comparative toner particle 4 | 155 | 210 | 55 | 0.2 | 3.6 | 0.2 | 1.8 |
| Comparative 5 | Comparative toner particle 5 | 135 | 175 | 40 | 1.9 | 3.2 | 0.2 | 0.1 |
| Comparative 6 | Comparative toner particle 6 | 115 | 130 | 15 | 0.2 | 0.2 | 1.1 | 3.8 |
| Comparative 7 | Comparative toner particle 7 | 140 | 180 | 40 | 1.2 | 1.1 | 0.2 | 3.1 |

Examples 2 to 48 and Comparative Examples 1 to 7

Toners obtained by externally adding silica fine particles to toner particles 2 to 48 and comparative toner particles 1 to 7 in the same manner as to the toner particles 1 were evaluated. Tables 6-1 and 6-2 show the evaluation results.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-100448, filed Jun. 22, 2022 which is hereby incorporated by reference herein in its entirety.

What is claimed is:

1. A toner comprising a toner particle, the toner particle comprising a binder resin which is a vinyl resin, wherein where a chloroform-soluble component of the binder resin extracted from the toner particle is a soluble portion obtained by extraction from the toner particle for 48 h in Soxhlet extraction using a chloroform solvent from which a component having a molecular weight of 2000 or less is removed by recycling HPLC, and the chloroform-soluble component of the binder resin is analyzed by gradient LC analysis using acetonitrile as a poor solvent and chloroform as a good solvent for the chloroform-soluble component of the binder resin, and changing linearly from a mobile composition of 100% by volume of acetonitrile to a mobile phase of 100% by volume of chloroform, when an area of a peak detected using a Corona charged particle detector in a range of a ratio of chloroform in the mobile phase of 50.0 to 75.0% by volume is defined as SA and a maximum value of the peak is defined as PA, an area of a peak detected using a Corona charged particle detector in a range of a ratio of chloroform in the mobile phase of 75.0 to 95.0% by volume is defined as SB and a maximum value of the peak is defined as PB, and a smallest minimum value exists between the PA and the PB is defined as VAB, the PA and the PB exist, and the SA, the SB, the PB, and the VAB satisfy formulas (1) and (2):

$$0.30 \leq SA/SB \leq 0.85 \quad (1)$$

$$0.25 \leq VAB/PB \leq 0.55 \quad (2)$$), wherein when a resin obtained by extracting a component in the range of the ratio of chloroform in the mobile phase of 50.0 to 75.0% by volume in the gradient LC analysis is defined as a resin A, which is a resin component corresponding to the PA, a content ratio of the resin A in the binder resin comprised in the toner particle is defined as MA (% by mass), a resin obtained by extracting a component in the range of the ratio of chloroform in the mobile phase of 75.0 to 95.0% by volume in the gradient LC analysis is defined as a resin B, which is a resin component corresponding to the PB, a content ratio of the resin B in the binder resin comprised in the toner particle is defined as MB (% by mass), a resin component obtained by separating an insoluble component obtained by extraction from the toner particle for 48 h in the Soxhlet extraction using a chloroform solvent, and removing incineration ash residue from the obtained insoluble component is defined as a resin C, and a content ratio of the resin C in the binder resin comprised in the toner particle is defined as MC (% by mass), the MA, the MB and the MC satisfy formulas (8), (9), (10) and (11):

$$MA+MB+MC \leq 100.0 \quad (8)$$

$$25.0 \leq MA \leq 55.0 \quad (9)$$

$$15.0 \leq MB \leq 50.0 \quad (10)$$

$$3.0 \leq MC \leq 30.0 \quad (11)$$, and wherein the resin C has a monomer unit (b) represented by formula (12):

(12)

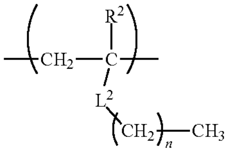

in formula (12), $R^2$ represents a hydrogen atom or a methyl group, $L^2$ represents a single bond, an ester bond, or an amide bond, and n represents an integer of 15 to 30.

2. The toner according to claim 1, wherein the resin B has a monomer unit (a) represented by formula (3):

(3)

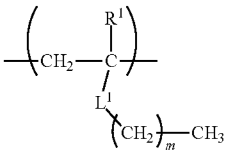

in formula (3), $R^1$ represents a hydrogen atom or a methyl group, $L^1$ represents a single bond, an ester bond or an amide bond, and m represents an integer of 15 to 30.

3. The toner according to claim 2, wherein a content ratio of the monomer unit (a) represented by formula (3) in the resin B is 40.0 to 95.0% by mass.

4. The toner according to claim 2, wherein when an acid value of the resin B is defined as AVb (mg KOH/g), the AVb satisfies formula (4):

$$1.5 \leq AVb \leq 25.0 \quad (4).$$

5. The toner according to claim 1, wherein when a half-value width of the PA is defined as HPA (% by volume), the HPA satisfies formula (5):

$$3.0 \leq HPA \leq 10.0 \quad (5).$$

6. The toner according to claim 1, wherein an acid value of the resin A is defined as AVa (mg KOH/g), the AVa satisfies formula (6):

$$0.0 \leq AVa \leq 3.0 \quad (6).$$

7. The toner according to claim 6, wherein the resin A has a styrene-based monomer unit and a (meth)acrylic acid alkyl ester-based monomer unit.

8. The toner according to claim 1, wherein when in the gradient LC analysis, a volume fraction of chloroform in the mobile phase when the PA is expressed is defined as CA, and a volume fraction of chloroform in the mobile phase when the PB is expressed is defined as CB, the CA and the CB satisfy formula (7):

$$10.0 \leq CB-CA \leq 30.0 \quad (7).$$

9. The toner according to claim 1, wherein the resin A has a glass transition point Tga (C), the resin B has a melting point Tmb (° C.), the resin C has a melting point Tmc (° C.), and the Tga (° C.), the Tmb (° C.) and the Tmc (° C.) satisfy formulas (13), (14) and (15):

$$40.0 \leq Tga \leq 65.0 \quad (13)$$

$$50.0 \leq Tmb \leq 75.0 \quad (14)$$

$$45.0 \leq Tmc \leq 65.0 \quad (15).$$

* * * * *